(12) United States Patent
Kaji

(10) Patent No.: US 6,549,815 B1
(45) Date of Patent: Apr. 15, 2003

(54) METHOD AND APPARATUS FOR OPTIMIZING OVERALL CHARACTERISTICS OF DEVICE, USING HEURISTIC METHOD

(75) Inventor: Hirotaka Kaji, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/517,392

(22) Filed: Mar. 2, 2000

(30) Foreign Application Priority Data

| Mar. 2, 1999 | (JP) | 11-054279 |
|---|---|---|
| Mar. 2, 1999 | (JP) | 11-054309 |
| Mar. 2, 1999 | (JP) | 11-054340 |

(51) Int. Cl.⁷ .......................... G05B 13/02; G06F 19/00
(52) U.S. Cl. ........................ 700/32; 700/108; 700/65
(58) Field of Search ............... 700/20, 28–37, 700/47–50, 52, 53, 65, 108–110; 702/85; 703/2, 13, 23; 706/1–10, 12–17, 19, 25

(56) References Cited

U.S. PATENT DOCUMENTS

| 5,153,807 A | | 10/1992 | Saito et al. | 700/45 |
|---|---|---|---|---|
| 5,159,562 A | | 10/1992 | Putman et al. | 700/288 |
| 5,347,447 A | | 9/1994 | Kiji et al. | 700/32 |
| 5,465,204 A | * | 11/1995 | Sekine et al. | 700/32 |
| 5,587,896 A | * | 12/1996 | Hansen et al. | 700/28 |
| 5,625,552 A | * | 4/1997 | Mathur et al. | 700/42 |
| 5,634,039 A | * | 5/1997 | Simon et al. | 703/18 |
| 5,818,714 A | * | 10/1998 | Zou et al. | 700/37 |
| 5,826,249 A | | 10/1998 | Skeirik | 706/25 |
| 5,838,595 A | * | 11/1998 | Sullivan et al. | 703/2 |
| 5,847,952 A | * | 12/1998 | Samad | 700/48 |
| 6,041,320 A | * | 3/2000 | Qin et al. | 706/1 |
| 6,055,483 A | * | 4/2000 | Lu | 702/31 |
| 6,122,555 A | * | 9/2000 | Lu | 700/9 |
| 6,212,466 B1 | * | 4/2001 | Ulyanov et al. | 701/99 |

FOREIGN PATENT DOCUMENTS

| EP | 0 496 570 A2 | 7/1992 |
|---|---|---|
| EP | 0957416 | * 11/1999 |
| WO | 98-50831 | * 11/1998 |

OTHER PUBLICATIONS

Q.H.Wu, et al., On–line evaluation of auto–tuning optimal PID controller on micromachine system, Department of Electrical and Electronic Engineering. The Queen's University of Belfast, U.K. Jul. 3, 1990 pp. 7751–7769.

P.K.Dash, et al., Fuzzy and Neural Controllers for Dynamic Systems: an Overview, Department of Electrical Engineering National University of Singapore, 5/97 pp. 810–816.

* cited by examiner

Primary Examiner—Maria N. Von Buhr
(74) Attorney, Agent, or Firm—Knobbe Martens Olson & Bear LLP

(57) ABSTRACT

A method for optimizing overall characteristics optimizes control parameters in at least one control module required for controlling a device, using an optimization method such as a heuristic method. The method includes the steps of: (a) preselecting values of the control parameters and activating the device; (b) on-line changing values of the control parameters within predetermined ranges under predetermined coding rules; (c) on-line evaluating the performance of the device based on signals indicative of the performance; (d) on-line selecting values of the control parameters based on the evaluation outcome; and (e) repeating steps (b) through (d) while operating the device until desired performance of the device is demonstrated, wherein the at least one control module is optimized. In the method, when two or more control modules control performance of the device, optimization by steps (a) through (d) may be conducted on each control module in repetitive sequence.

11 Claims, 21 Drawing Sheets

| SP$_1$ | SP$_2$ | DR | AG |
|---|---|---|---|

Figure 6

METHOD AND APPARATUS FOR OPTIMIZING OVERALL CHARACTERISTICS OF DEVICE, USING HEURISTIC METHOD

BACKGROUND OF THE INVENTION

1. Field of the Invention

The present invention relates to a method and an apparatus for optimizing a control module for controlling a controlled system, and a cooperative method for optimization in a method for optimizing a characteristic of the control module.

2. Description of the Related Art

In the past, optimal values of a characteristic of a control module (namely, parameter values for deciding input-output relationship of the control module) to control a controlled system were determined by experiment at the stages of design or setting before shipment, so that users of a product comprising a controlled system were assumed and the users' characteristics (preference, technique, personality, and use) could be met.

However, with the diversity and advancement of recent technology, the conventional method of deciding optimal values of a characteristic of the control module by experiment brings about difficulty for optimizing the control module, and requires a lot of time. Since personal characteristics or preferences vary from one person to another, the conventional control method cannot provide a characteristic of products which satisfy all users. To solve the problem, there is proposed an evolutionary control system that comprises a basic control module which determines a control output of a controlled system based on predetermined input information, a compensation control module which determines a compensation value for the output of the basic control module, and an evolutionary control module which determines the input-output relationship of the compensation control module by a hereditary algorithm according to the user's intention. The system learns as a teacher data the input-output relationship through which the compensation control module is optimized by an optimal control module.

The system optimizes the input-output relationship of the compensation control module by the evolutionary control module under user's direct instruction as the user's intention, reflecting the compensation control module, which enables each user to obtain a preferred characteristic of the control module in accordance with his feelings. The use of a hereditary algorithm realizes a simple and short-time optimization.

However, the evolutionary control system had the problem that since the input-output relationship of the compensation control module was optimized by the evolutionary control module and the compensation control module was supposed to learn the optimized input-output relationship, it took some time for learning and it also took some time for the optimized characteristic to be reflected to the controlled variable. The system also had the problem that operation was complex.

The object of the present invention is, by solving the problems in the prior art, to reflect the optimized characteristic to the controlled system in a short period of time and to provide a method and an apparatus for optimizing an overall characteristic which simplify the operation.

Moreover, a characteristic optimizing method in prior art has the problem that with regard to a controlled system, a fuel injector, since a plurality of characteristics-fuel consumption performance and drivability performance-are independently optimized, when fuel consumption performance is improved, drivability performance becomes lower, and vice versa, which is a trade-off of optimization of both characteristics. When a plurality of control modules required for controlling a device or controlled system are used, output of manipulated variables of the device and the characteristics of each control module are optimized independently, and thus the same problems as above are raised.

An object of a cooperative method for optimization in a method for optimizing a characteristic is to solve the disadvantage of the prior art and to provide a method for cooperation in order to optimize a plurality of characteristics despite the presence of a trade-off.

SUMMARY OF THE INVENTION

The present invention provides a method for optimizing overall characteristics of a device. The method controls performance of a device, which performance is controlled essentially by at least one control module having an input-output relationship regulated by control parameters. In an embodiment, the method comprises the steps of: (a) preselecting values of the control parameters and activating the device; (b) on-line changing values of the control parameters within predetermined ranges under predetermined coding rules; (c) on-line evaluating the performance of the device based on signals indicative of the performance; (d) on-line selecting values of the control parameters based on the evaluation outcome; and (e) repeating steps (b) through (d) while operating the device until desired performance of the device is demonstrated, wherein the at least one control module is optimized. In the above, in another embodiment, at least two control modules control performance of the device, and optimization by steps (a) through (d) is conducted on each control module in repetitive sequence. In the above, "on-line" means operation on a real-time basis.

In the above, in an embodiment, the device is a control module for controlling another device.

According to the present invention, the problems described above can be resolved.

The present invention can include the following embodiments:

The method optimizes control parameters in a regular control module (i.e., a control module essentially required for controlling a device or system), using an optimization method directly, that determines an output associated with a manipulated variable of a controlled system based on predetermined input information. In the above, the device can be another control module.

The method is the optimization method that uses heuristics.

The method provides an optimal control module for performing said optimization, and after finishing optimal process in said optimal control module, updates the control parameters of the regular control module to the optimized control parameters. The method, in addition, learns the control parameters optimized to the regular control module.

The method provides said regular control module with a control module for executing control and a control module for learning, and after said control module for learning has learned the optimized control parameters, switches said control module for executing control for said control module for learning.

The method provides an optimal control module for outputting the control parameters of the regular control module based on predetermined input information, and optimizes the control parameters of the regular control module by optimizing said optimal control module.

The method uses an algorithm, when the regular control module changes at least part of the control parameters, that can predict influence to other control parameters by the change, uses an algorithm, when the regular control module changes at least part of the control parameters, that can predict influence to the output of the control module by the change, and uses an algorithm that has a linear input-output relation.

The method, as said optimization method, uses an evolutionary calculation method, an adjacent search method and/or an enforced learning method. The evolutionary calculation method includes, for example, a hereditary algorithm, an evolutionary strategy or an evolutionary programming. The adjacent search method includes, for example, an simulated annealing, a hill climbing, a random walk, and a TABU search. The enforced learning method includes, for example, a Q learning or a classifier system.

Said regular control module is the control module which outputs the manipulated variable of the controlled system based on predetermined input information, and inputs a manipulated variable for a user and outputs a manipulated variable for the controlled system.

Said controlled system is a means for controlling performance of a final controlled system, and said final controlled system is a motor, a prime mover, or a combination of a motor and a prime mover.

When said means for controlling performance of a final controlled system is a electronic throttle, said regular control module inputs a manipulated variable of a throttle lever and outputs a manipulated variable of an intake air amount changing means. Said regular control module has control parameters regarding a static characteristic of the manipulated variable of an intake air amount changing means about the manipulated variable of a throttle lever, and control parameters regarding a dynamic characteristic of the manipulated variable of an intake air amount changing means about the manipulated variable of a throttle lever, as a first-order lag time constant and/or an acceleration compensation coefficient that are/is added.

Said regular control module is that control module which outputs a compensated value or a compensation ratio regarding the manipulated variable of a controlled system based on predetermined input information.

Said controlled system is a means for controlling performance of a final controlled system, is a motor, a prime mover, or a combination of a motor and a prime mover, and can be, for example, an electronic control fuel injector or a non-stage transmission. For example, when said controlled system is an electronic control fuel injector, said regular control module outputs a compensation value or compensation ratio about a basic fuel injection amount to the injector based on input information.

When a controlled system is a non-stage transmission, said regular control module outputs a compensation value or compensation ratio about a gear ratio of the non-stage transmission based on input information.

Said optimization is made based on evaluation under user's intention and/or predetermined evaluation reference. When evaluation reference is predetermined, said evaluation reference is set based on a basic characteristic of a controlled system with aging deterioration or regulation. about a controlled system.

In addition, evaluation can be combined, by setting beforehand the evaluation reference based on a regulation about a controlled system, preparing for evaluation under user's intention within a range of the evaluation reference, and optimizing the characteristic according to user's preference within the regulation.

To attain the object, an apparatus for optimizing an overall characteristic of the invention comprises a regular control unit including a regular control module which determines an output associated with a manipulated variable of a controlled system based on predetermined input information, and an optimal process unit for directly optimizing control parameters of said regular control module using an optimization method having heuristics.

Said optimal process unit includes an optimal operation device which performs operation on a optimization method, and an automatic evaluation device which conducts evaluation on optimal process based on evaluation reference set beforehand, whereby said optimal process controls control parameters obtained from the optimal operation by using the regular control module and optimization is proceeded with the result evaluated by the automatic evaluation device.

Said optimal process unit includes an optimal operation device which performs operation on a optimization method, and means for inputting evaluation based on user's intention on optimal process, whereby said optimal process controls control parameters obtained from the optimal operation by using the regular control module, and optimization is proceeded with the result evaluated by the automatic evaluation device.

Said optimal process unit includes an optimal operation device which performs operation on a optimization method, an optimal module for outputting values of the control parameters of the regular control module based on predetermined input information, and an automatic evaluation device which conducts evaluation on optimal process based on evaluation reference set beforehand, whereby said optimal process controls control parameters obtained from the optimal module by using the regular control module, and optimization of the optimal module is proceeded, with the result evaluated by the automatic evaluation device, so that optimal control parameters from the optimal module can be obtained.

Said optimal process unit includes an optimal operation device which performs operation on a optimization method, an optimal module for outputting values of the control parameters of the regular control module based on predetermined input information, and means for inputting evaluation based on user's intention on optimal process, whereby said optimal process controls control parameters obtained from the optimal module by using the regular control module, and optimization of the optimal module is proceeded, with the result evaluated by the automatic evaluation device, so that optimal control parameters from the optimal module can be obtained.

Said optimal operation device conducts operation on optimization by using an evolutionary calculation method, an adjacent search method and/or an enforced learning method.

Moreover, to accomplish the object, a cooperative method for optimization in a method for optimizing a characteristic comprises the steps of optimizing each characteristic of a plurality of regular control modules that determine an output associated with a manipulated variable of a controlled system based on predetermined input information, and after optimizing one regular control module, optimizing other regular control modules so that an obtained characteristic can be improved or maintained.

A cooperative method for optimization in a method for optimizing a characteristic comprising the steps of optimizing each characteristic of a plurality of regular control modules that determine an output associated with a manipulated variable of a controlled system based on predetermined input information, and optimizing a plurality of regular control modules at a interval so that obtained characteristics can be improved or maintained.

A cooperative method for optimization in a method for optimizing a characteristic comprising the steps of optimizing each characteristic of a plurality of regular control modules that determine an output associated with a manipulated variable of a controlled system based on predetermined input information, and during optimizing one regular control module, optimizing other regular control modules in parallel so that obtained characteristics the regular control module obtained can be improved or maintained.

A cooperative method for optimization in a method for optimizing a characteristic comprising the steps of optimizing each characteristic of a plurality of regular control modules that determine an output associated with a manipulated variable of a controlled system based on predetermined input information, and optimizing a plurality of regular control modules in parallel so that obtained characteristics can be improved or maintained.

The cooperative method comprises the steps of, for optimizing at least one of the regular control modules, using an automatic evaluation method which evaluates during optimization based on evaluation reference set beforehand, and for optimizing other regular control modules, using an interactive evaluation method which evaluates during optimization based on evaluation under user's intention.

In the cooperative method, said evaluation reference is set based on a reference characteristic of a controlled system having aging deterioration or a regulation of a controlled system. In addition, evaluation can be combined by beforehand setting the evaluation reference based on the regulation regarding one controlled variable, evaluating within a range of the evaluation reference under user' preference, and optimizing characteristics within a range of a regulation according to user's preference.

A cooperative method for optimization in a method for optimizing a characteristic comprises the steps of optimizing each of a plurality of characteristics of regular control modules that determine an output associated with a manipulated variable of a controlled system based on predetermined input information, and after optimizing other characteristics, optimizing other regular control modules so that an obtained characteristic can be improved or maintained.

A cooperative method for optimization in a method for optimizing a characteristic comprises the steps of optimizing each of a plurality characteristics of the regular control modules that determine an output associated with a manipulated variable of a controlled system based on predetermined input information, and optimizing a plurality of characteristics at a interval so that obtained characteristics can be improved or maintained.

A cooperative method for optimization in a method for optimizing a characteristic comprises the steps of optimizing each of a plurality characteristics of the regular control modules that determine an output associated with a manipulated variable of a controlled system based on predetermined input information, and during optimizing one characteristic, optimizing other characteristics in parallel so that the characteristic can be improved or maintained.

A cooperative method for optimization in a method for optimizing a characteristic comprises the steps of optimizing each of a plurality of characteristics of the regular control modules that determine an output associated with a manipulated variable of a controlled system based on predetermined input information, and optimizing a plurality of characteristics in parallel so that obtained characteristics can be improved or maintained.

The cooperative method comprises the steps of, for optimizing at least one of the regular control modules, using an automatic evaluation method which evaluates during optimization based on evaluation reference set beforehand, and for optimizing other regular control modules, using an interactive evaluation method which evaluates during optimization based on evaluation under user's intention.

In the cooperative method, said evaluation reference is set based on a reference characteristic of a controlled system having aging deterioration or a regulation of a controlled system. In addition, evaluation can be combined by beforehand setting the evaluation reference based on the regulation regarding one controlled variable, evaluating within a range of the evaluation reference under user' preference, and optimizing characteristics within a range of a regulation according to user's preference.

BRIEF DESCRIPTION OF THE DRAWINGS

FIG. 6 shows a coding example of a control parameter of an electronic throttle control module.

DETAILED DESCRIPTION OF THE PREFERRED EMBODIMENTS

Referring to some embodiments in the figures, a method for optimizing an overall characteristic, an apparatus for optimizing an overall characteristics, and a cooperative method for optimization in a method for optimizing a characteristic in accordance with the invention are explained.

FIGS. 1–13 show embodiments that apply the invention to a vehicle engine and a non-stage transmission control.

Figure 1:
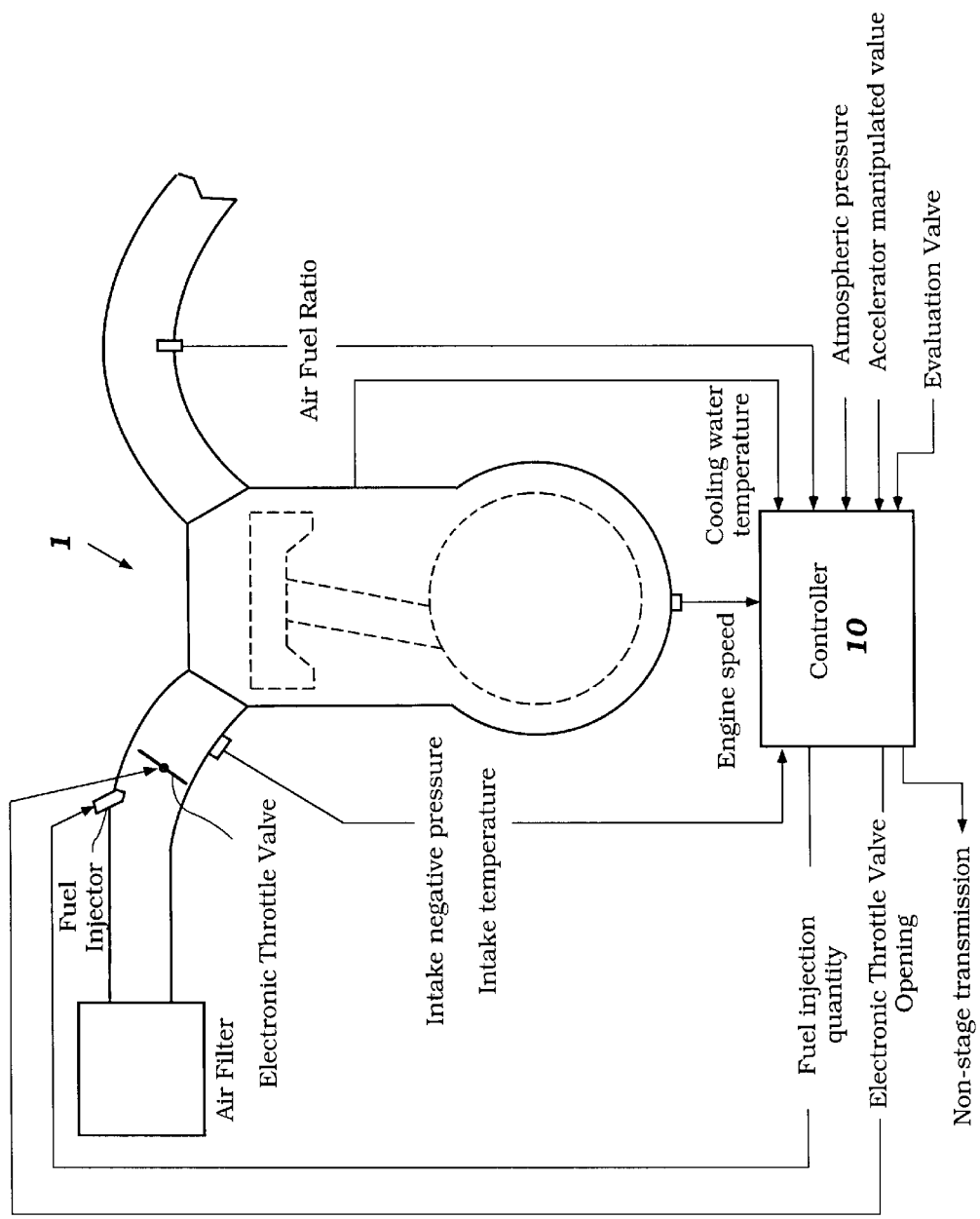
FIG. 1 is a diagram illustrating a relationship between an engine 1 and a controller 10 in accordance with the invention.

FIG. 1 is a diagram showing relationship between an engine 1 and a controller 10 that works the invention. The controller 10 is constructed so that fuel performance can be improved, obtaining desired drivability and acceleration. Herein "drivability performance" means output performance of an engine in response to a throttle operation. As shown in the figure, the controller 10 receives as inputs information of engine speed, intake negative pressure, accelerator manipulated value, atmospheric pressure, intake temperature, and cooling water temperature. Based on the input information, it manipulates a fuel injector, an electronic throttle valve, and a non-stage transmission, and controls fuel injection quantity, intake atmosphere quantity, and gear ratio, which leads to optimum control of drivability performance, acceleration performance, and fuel performance.

Figure 2:
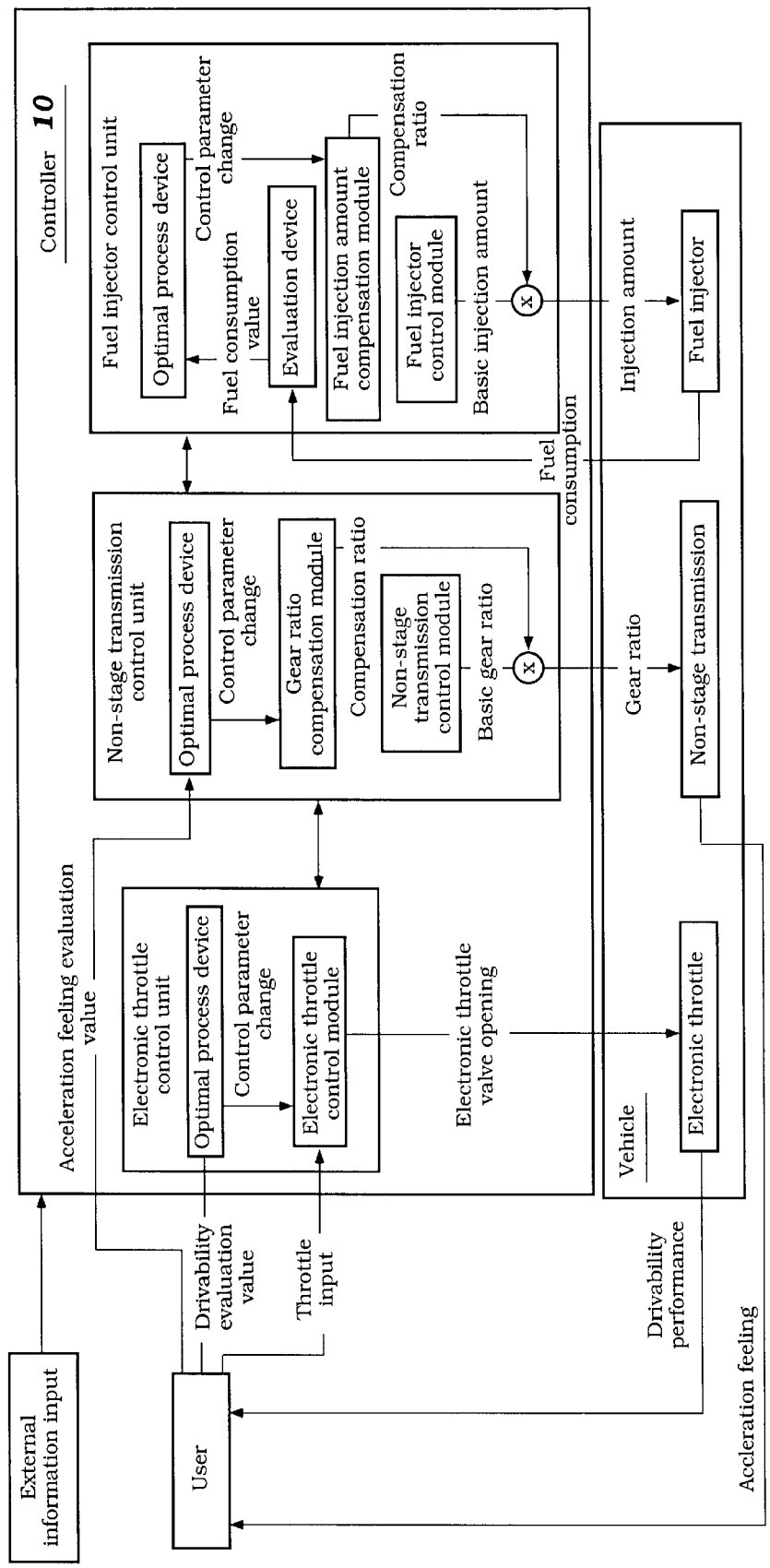
FIG. 2 is a block diagram of a controller 10.

FIG. 2 is a block diagram of the controller 10. As shown in the figure, the controller 10 comprises an electronic throttle control unit, a non-stage transmission control unit, and a fuel injector control unit. The electronic throttle control unit includes an electronic throttle control module that determines an opening of an electronic throttle valve based on predetermined input information, and an optimal process device that optimizes control parameters of the electronic throttle control module.

The non-stage transmission control unit includes a non-stage transmission control module that determines a basic gear ratio of a non-stage transmission based on predetermined input information (an external information input in FIG. 2), a gear ratio compensation module that determines a compensation ratio to the basic gear ratio, and an optimal process device that optimizes the compensation module.

The fuel injector control unit includes a fuel injector control module that determines a basic fuel injection amount based on predetermined input information (an external information input in FIG. 2), a fuel injection amount compensation module that determines a compensation ratio to the basic fuel injection amount, an optimal process device that optimizes the compensation module, and an evaluation device that evaluates the optimal process device.

Figure 3:
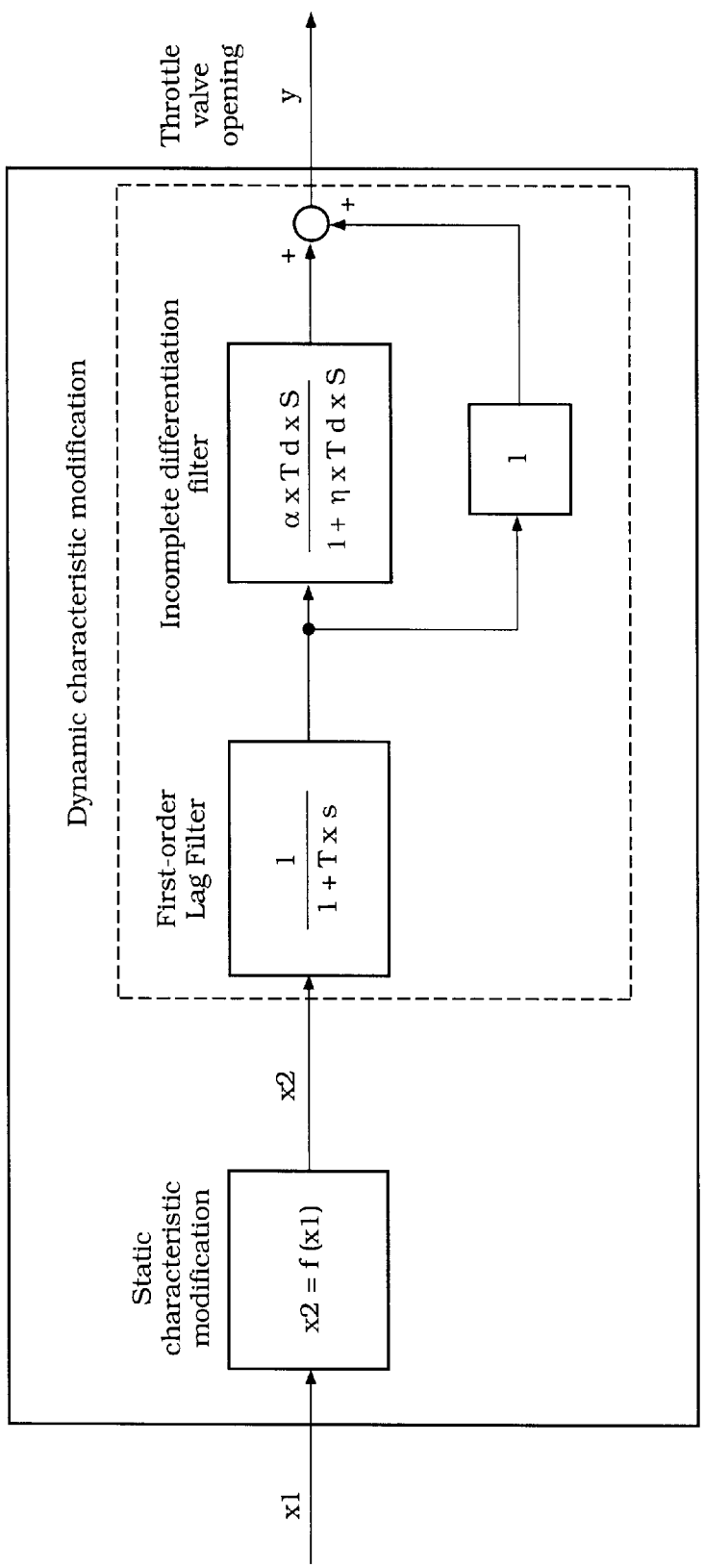
FIG. 3 is a block diagram of an electronic throttle control module.

FIG. 3 shows that the electronic throttle control module determines an opening of the electronic throttle valve based on an acceleration manipulated amount by a user. Herein the "acceleration manipulated amount" means information of both "an acceleration angle" and "an acceleration variable". The electronic throttle valve has two characteristics: static and dynamic. The former is the one derived from the relationship between the acceleration angle and the electronic throttle valve, which affects stationary running characteristics.

Figure 4:
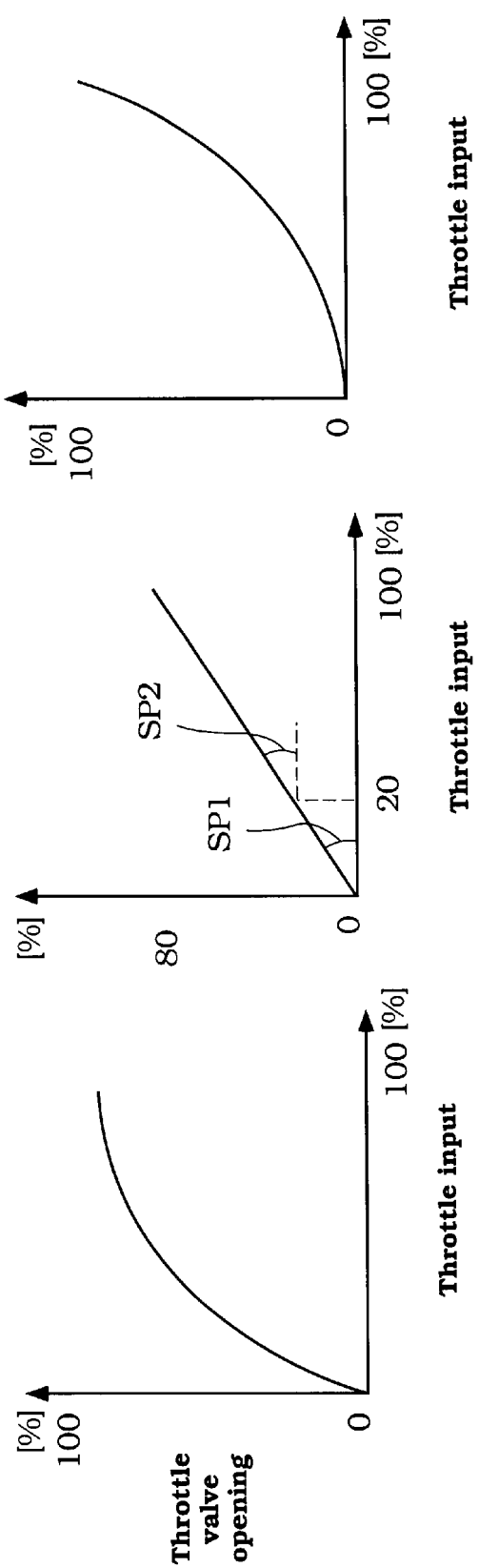
FIG. 4 is graphs illustrating static characteristics of some throttles.

FIG. 4 is graphs illustrating static characteristics of some throttles, where the different static characteristics are shown. There are three types of static characteristics: a low-opening sudden-acceleration type which shows that the electronic throttle valve opens large when an acceleration angle is small, and it opens gradually to be fully open as the acceleration angle gets bigger; a high-opening sudden-acceleration type which shows that the electronic throttle valve opens gradually while the acceleration angle is small, and it opens suddenly to be fully open when the acceleration angle gets bigger; and a linear type which shows that the acceleration angle is proportional to the throttle opening. In this way, the same acceleration angle produces different throttle openings. These static characteristics should demonstrate that as the acceleration angle gets bigger, the throttle opening increases or is constant, which allows different kinds of functions. In the embodiment, the static characteristic is optimized, by optimizing throttle valve opening ratio SP1 when throttle opening is 0–20% and throttle valve opening ratio SP2 when throttle opening is 20–100%.

Figure 5:
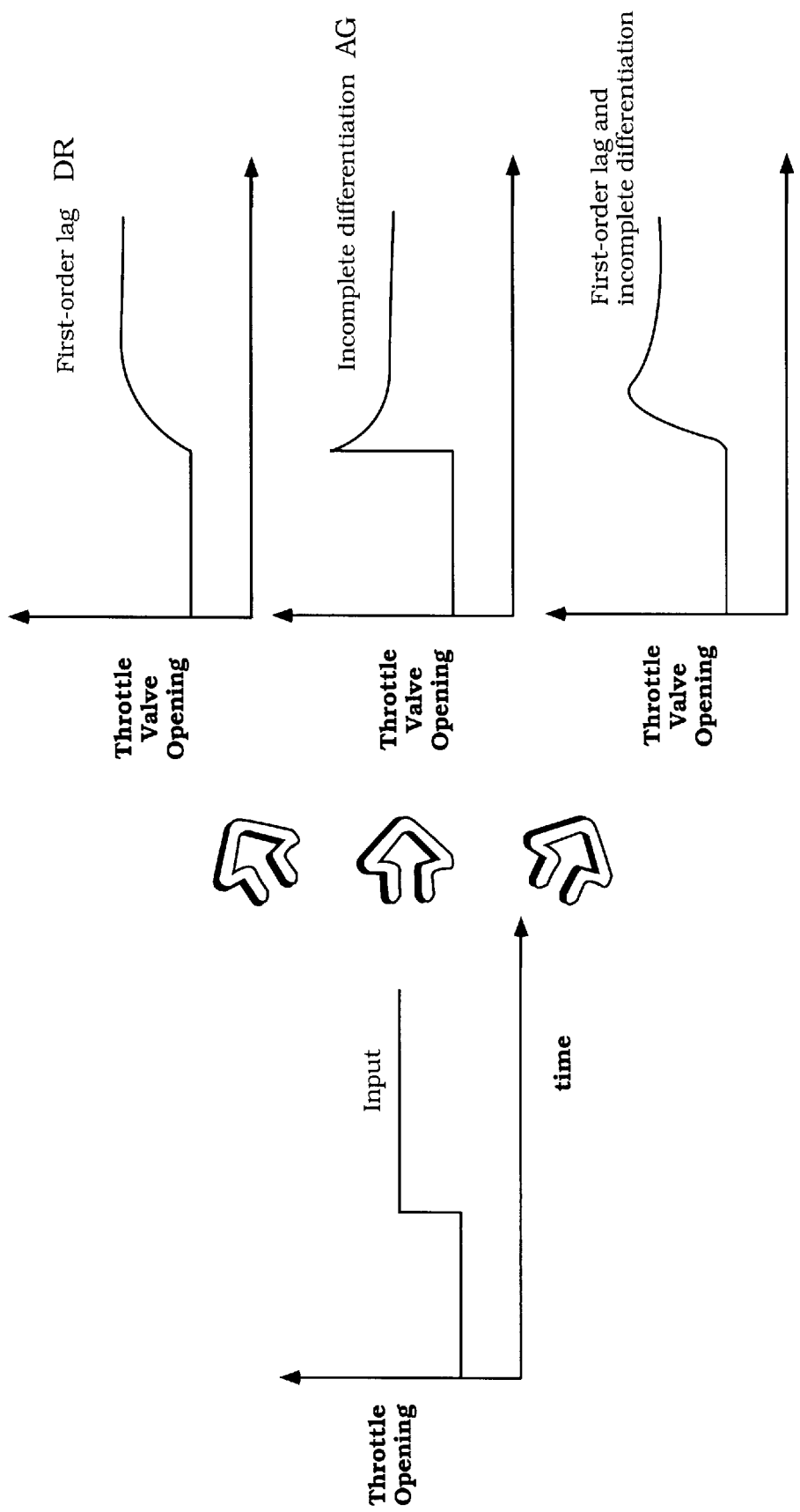
FIG. 5 is graphs illustrating dynamic characteristics of some throttles.

FIG. 5 shows a dynamic characteristic of some throttles. The latter of the electronic throttle valve characteristics, i.e., dynamic characteristic is the one derived from changed speeds of the throttle valve to changed speeds of the accelerator, which affects a transient characteristic of a vehicle. To be specific, the characteristic represents changed speeds of the throttle to changed speeds of the accelerator in a combination of first-order lag and incomplete differentiation. As shown in the figure, in a combination of first-order lag and incomplete differentiation, there are provided three types: the low-response type which shows that the throttle opens relatively slowly in response to acceleration manipulation; the high-response type which shows that although some spikes are produced in response to acceleration manipulation, the throttle responds fast and opens; and the type between the aforementioned two types. In this way, different types of dynamic characteristic are obtained. In the embodiment, the dynamic characteristic is optimized by optimizing first-order lag time constant DR and acceleration compensation factor AG.

Figure 6:
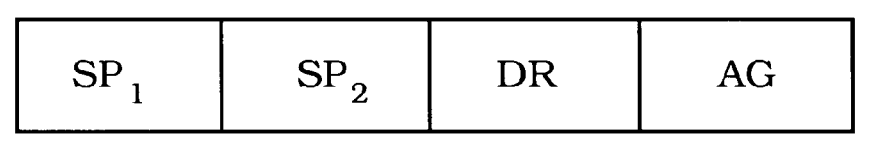

FIG. 6 shows coding of the control parameters of the electronic throttle control module. The optimal process device in the electronic throttle control unit employs, for example, a evolutionary calculation method, and codes as one individual the control parameters (throttle valve opening ratios SP1 and SP2, first-order lag time constant DR, and acceleration compensation factor AG) of the electronic throttle control module as shown in FIG. 6, which are to be optimized using a evolutionary calculation method. Evaluation of the value of each control parameter during optimal process is conducted based on drivability performance a user feels in a real situation. As a result, each of the control parameters is optimized according to the user's evaluation, which in turn produce the optimum characteristic of the electronic throttle (drivability characteristic) the user desires.

In this way, the method by which the user conducts the evaluation in optimum process is called interactive evaluation herein. In the embodiment, regarding as one individual a combination of a static characteristic and a dynamic characteristic, the entire combination is optimized. However, there are other means described below.

1. An operator sets a static characteristic beforehand to optimize a dynamic characteristic only.
2. A static characteristic and a dynamic characteristic are optimized independently and individually.
3. A static characteristic is evolved first and then fixed; a dynamic characteristic is optimized.

The non-stage transmission control module outputs a basic gear ratio in response to predetermined inputs (for example, vehicle speed, and throttle valve opening) based on a basic gear ratio map. The gear ratio compensation module is comprised of a neural network which outputs a compensation ration to the basic gear ratio in response to predetermined inputs (for example, vehicle speed, and throttle valve opening).

The optimal process device in the non-stage transmission control unit employs as optimal operation, for example, a evolutionary calculation method, conduct coding of a coupling coefficient of the neural network (control parameter) constituting the gear ratio compensation module to generate individuals, and optimizes the coupling coefficient (control parameter) using the evolutionary calculation method. Evaluation of the value of each control parameter during optimal process is made based on acceleration feeling the user has in a real situation. As a result, the control parameters for the gear ratio compensation module are optimized according to the user's evaluation, which brings about an optimal characteristic of the non-stage transmission (acceleration) the user desires.

Figure 7:
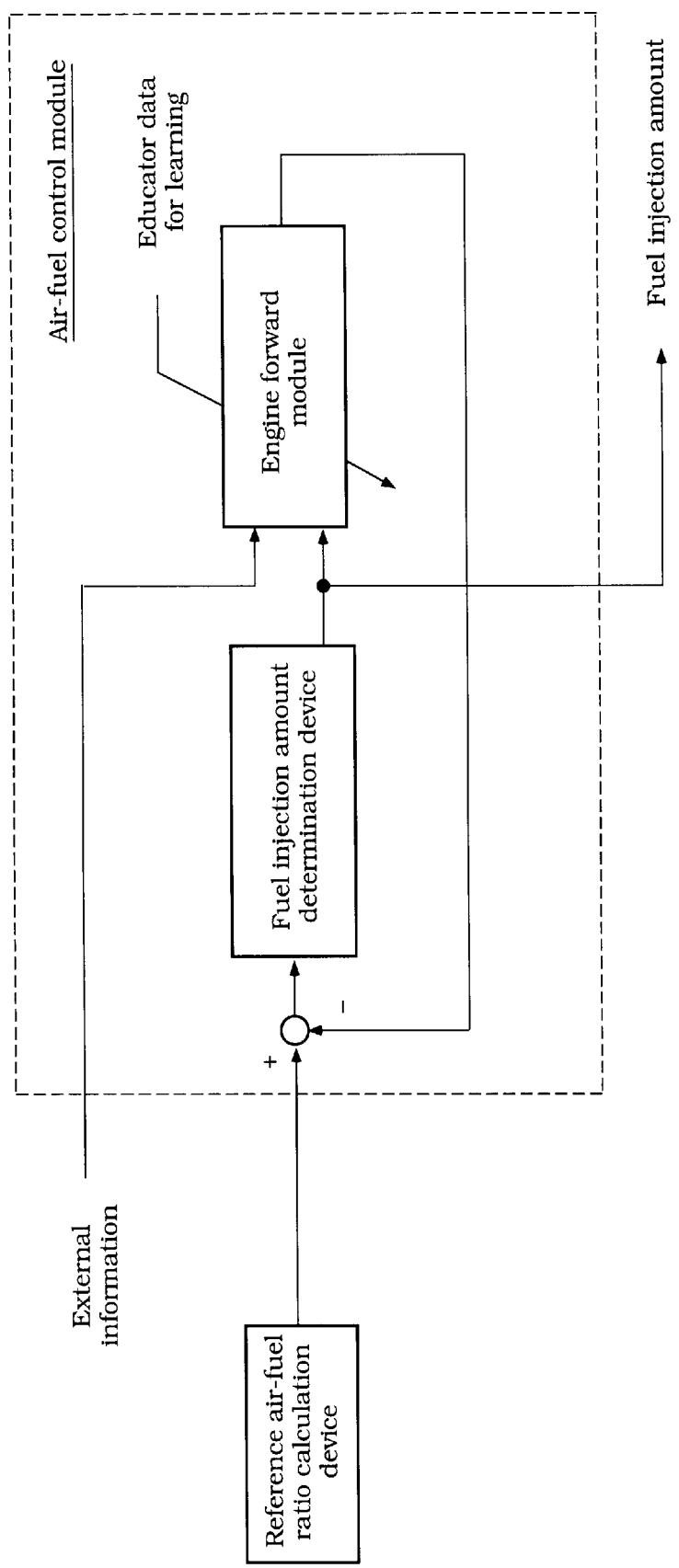
FIG. 7 is a block diagram a fuel injector control module.

FIG. 7 show a block diagram of the fuel injector control module. The fuel injector control module includes an engine forward model that is modeled using a feedforward control logic with learning function, and a fuel injection amount determination device that determines a basic injection amount of the fuel injector based on an output of the engine forward model and an reference air-fuel ratio. The reference air-fuel ratio is calculated based on an engine speed and an throttle opening by a reference air-fuel ratio calculation device.

Figure 8A:
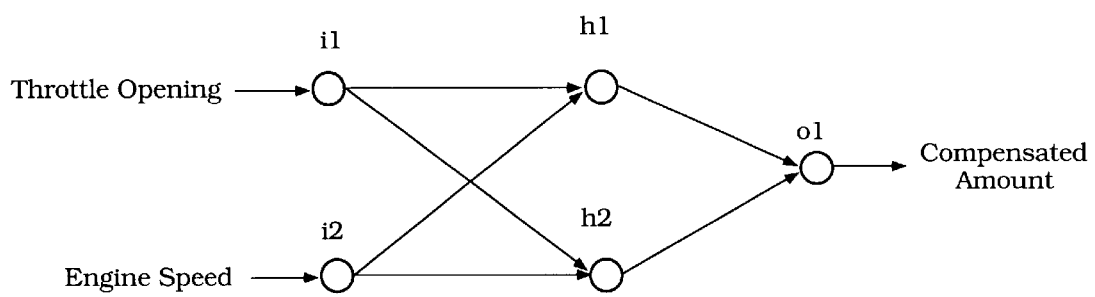
FIG. 8(a) is a diagram of neural network constituting a fuel injection amount compensating module and FIG. 8(b) shows a coding example of control parameters of a fuel injection control module.
Figure 8B:
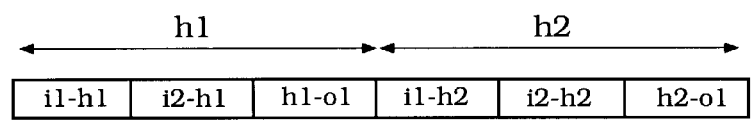

FIG. 8(*a*) shows a neural network constituting a fuel injection amount compensation module. The fuel injection amount compensation module consists of a neural network that inputs a throttle opening and an engine speed and outputs a compensated amount. The compensated amount obtained is multiplied by the basic fuel injection amount output at the fuel injector control module to obtain a final fuel injection amount.

FIG. 8(*b*) shows encoding of the control parameters of the fuel injection control module. The optimal process device in the fuel injector control unit employs as optimal operation, for example, an evolutionary calculation method, encodes the coupling coefficients of the neural network constituting the fuel injection amount compensation module to produce individuals, and optimizes the coefficients (control parameters) using the evolutionary calculation method.

Evaluation of the value of each control parameter during optimal process is made by a evaluation device in which desired fuel consumption is set. As a result, the coupling coefficients (control parameters) for the fuel injection amount compensation module are optimized automatically toward the desired fuel consumption, which provides an optimal fuel consumption characteristic. In this way, the method through which evaluation in optimal operation is done by the evaluation device designed beforehand and optimization is conducted automatically is called an automatic evaluation.

Next, the optimal process in the electronic throttle control unit, the non-stage transmission control unit and the fuel injector control unit will be explained below.

Figure 9:
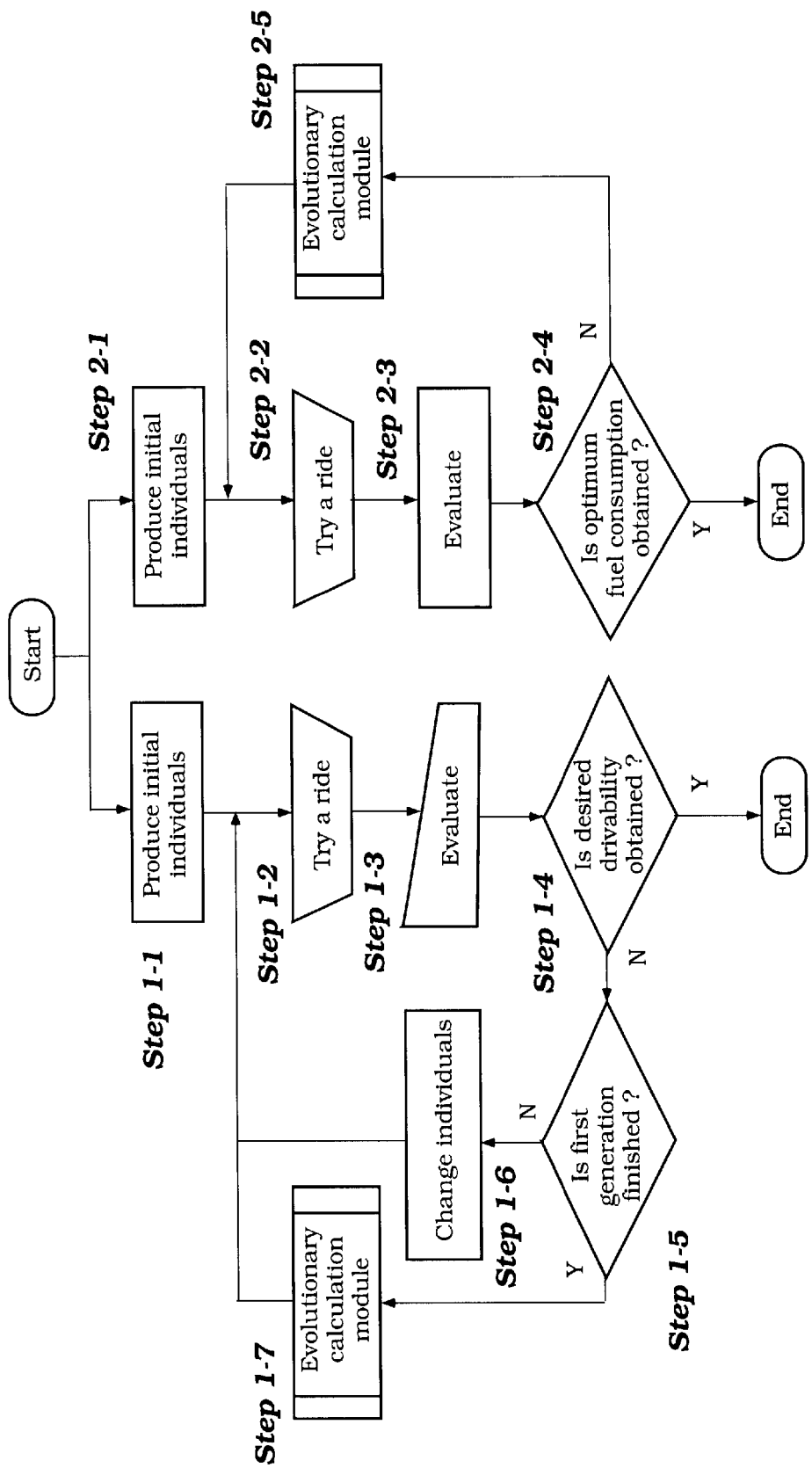
FIG. 9 is a flowchart illustrating optimum process by a controller 10.

FIG. 9 is a flowchart showing optimal process of the controller 10. When performing the optimal process, the controller 10 uses interactive evaluation the in electronic throttle control unit and the non-stage transmission control unit and automatic evaluation in the fuel injector control unit. Since different evaluation methods produce different optimal processes, the optimal process using interactive evaluation and the optimal process using are explained independently.

a. Optimal Process in the Electronic Throttle Control Unit and the Non-stage Transmission Control Unit As shown in FIG. 9, the initial values of the control parameters (in the electronic throttle control unit, static characteristics SP1 and SP2, and dynamic characteristics DR and AG; in the non-stage transmission control unit, coupling coefficients of the neural network) optimizing the control modules which are a optimal subject in each control unit are determined first at random within a predetermined range, and a first generation comprising a plurality of initial individuals are produced (step 1-1). Using parameters of any individual of the first generation, a ride is tried (step 1-2). A user inputs an evaluation value to the individual (step 1-3). Based on the evaluation value, it is determined whether desired drivability or acceleration is obtained (step 1-4). If obtained, evolutionary process ends. If not obtained, it is determined whether a trial ride and an evaluation for all the individuals of the first generation are finished (step 1-5). If a trial ride and an evaluation for all the individuals are not finished, the parameters of the control module are changed to those of another individual (step 1-6) and a ride is tried once again (step 1-2). When a trial ride and an. evaluation for all the individuals are finished, an evolutionary calculation module begins (step 1-7), an individual group of the next generation is produced, and once again a trial ride and an evaluation using the parameters of the individuals are conducted.

The process is repeated until the desired drivability and acceleration are obtained. Therefore the parameters of the electronic throttle control module and the gear ratio compensation module are optimized.

The interactive evaluation of drivability and acceleration is explained. An input apparatus for evaluation value manipulable during operation is realized using a button so that a user can go into evolution. After a trial ride, by pressing the button, the user inputs an evaluation value for an individual on which he made a trial ride. The evaluation value is determined based on a length of time when the button is being pressed. To be specific, for example, there is a method by which a predetermined constant is multiplied by a reciprocal of time being pressed or a method by fuzzy rules are used for calculation. By doing so, even if there is ambiguity in human evaluation, the evaluation value is obtained to some degree of exactness and the user can come to use an evolutionary method interactively.

When the button is pressed beyond a fixed amount of time, the individual during evaluation can be changed to another individual at that time. By doing so, the user can immediately change individuals with undesired characteristics, which enables faster evolution. The change of the individuals can be made only while a vehicle is being stopped, which is effective in excluding the influence by a sudden change of the throttle characteristic during a run.

b. Optimal Process in the Fuel Injector Control Unit

As shown in FIG. 9, the initial values of the control parameters (in the fuel injection amount compensation module, coupling coefficients of the neural network) optimizing the control modules which are a optimal subject in each control unit are determined first at random within a predetermined range, and a first generation comprising a plurality of initial individuals are produced (step 2-1). And fuel consumption of all the individuals in the first generation is calculated (step 2-2). Now the calculation of fuel consumption is explained below. With regard to the fuel injection control evolution module, a plurality of individuals are worked falsely and in parallel by time division, and evaluation values derived from a total of the duration are compared.

Figure 10:
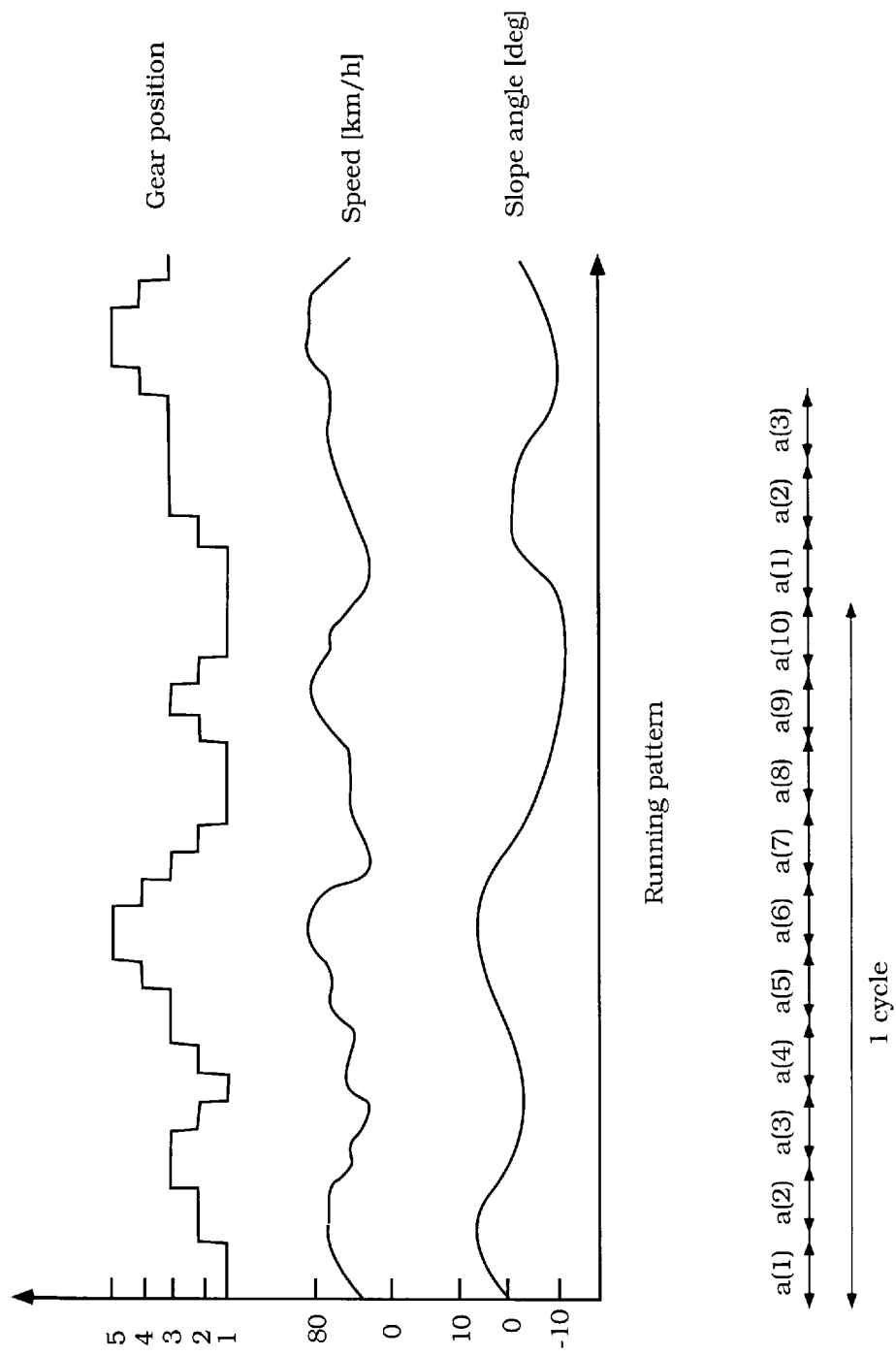
FIG. 10 is a diagram illustrating one example of division methods that evaluates each individual by time-division.

FIG. 10 is a diagram illustrating one example of division methods that evaluates each individual by time-division. To be specific about the comparison of evaluation values, for example, as shown in FIG. 10, ten individuals are controlled for one minute each, and with this as one cycle twenty cycles are repeated. The total running length for a evaluation period is divided by fuel consumption amount to get fuel consumption, i.e., evaluation value. This enables comprehension of the influence by a gear position difference and a slope angle as a total, which allows a fair evaluation of the characteristic of each individual.

Based on the fuel consumption of each individual (namely, evaluation value) derived from the fuel consumption calculation process (step 2-2), it is judged whether it is an optimal fuel consumption characteristic (step 2-3). As a result of the evaluation, it is determined whether optimal fuel consumption is obtained (step 2-4). If it is, the optimal process is ended; if not, the evolutionary calculation module begins (step 2-5) to produce a group of individuals for a next generation.

Some examples of the evolutionary calculation modules will be explained.

a. Hereditary Algorithm

Figure 11:
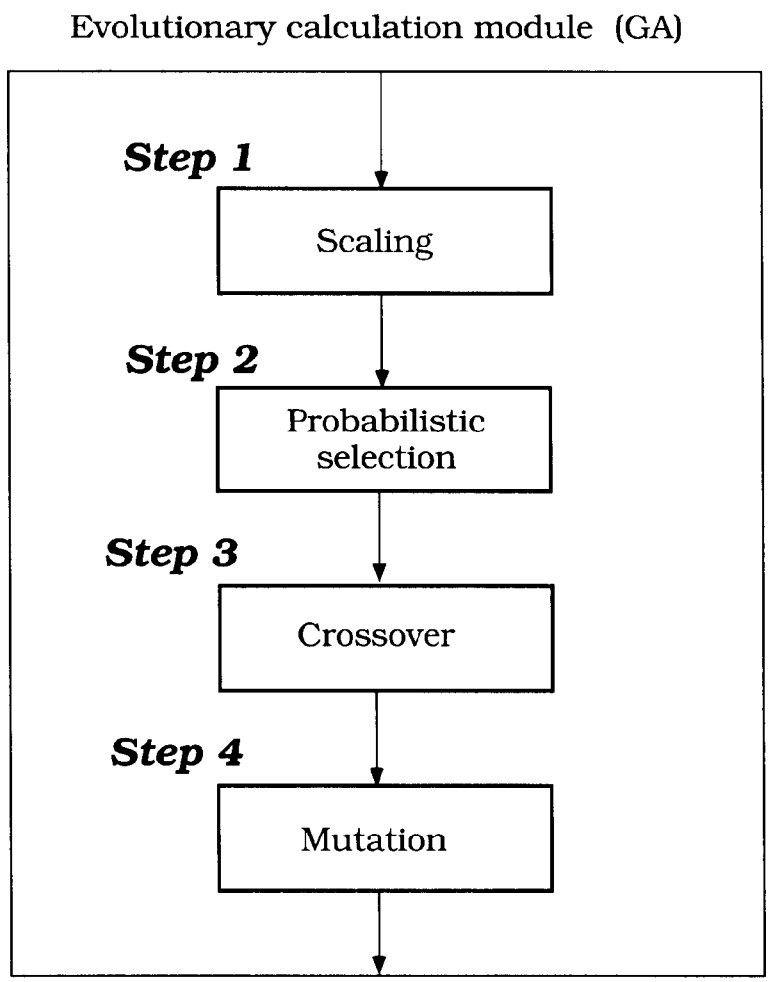
FIG. 11 is a flowchart illustrating an evolutionary calculation module that employs a hereditary algorithm as an evolutionary calculation method.

FIG. 11 is a flowchart illustrating an evolutionary calculation module that uses a hereditary algorithm as a evolutionary calculation method. After completing evaluation of all the individuals of the first generation, the module produces a group of individuals for a next generation when the desired characteristic is not obtained.

With regard to scaling (step 1), linear transformation of adaptability is performed so that the ratio of maximum adaptability to average adaptability in an individual group can be constant.

With regard to selecting (step 2), a roulette selecting system may be employed that selects probabilistically proportional to the user's evaluation value (adaptability). a tournament selecting system may also be used which selects the individual with the best evaluation value among n randomly selected individuals.

With regard to crossing over (step 3), there are systems which use one point crossing over, two point crossing over, and normal distribution crossing over. A selected crossing-over parent happens to be the same individual, but if this situation is left, versatility as an individual group will be lost. On the ground of this, when a parent selected at crossing over is the same individual, another selected individual should be replaced to avoid the crossing over of the same individual as much as possible.

With regard to mutating (step 4), value of each gene of individuals is changed randomly at a predetermined probability. There is another method which adds perturbation following a normal distribution. In spite of the fact that different individuals are selected as crossing-over parents, when they are quite the same in terms of heredity, mutation for both of the crossing-over parents is produced with a higher probability than usual.

Other than the methods mentioned above, there can be employed a generation change method called "regeneration" that replaces all the individuals of one generation at one time. When strictly applying to generation change, there is a possibility that a individual with high evaluation will be destroyed. Therefore, the strategy should be used that the elite (individuals with high evaluation) are left unconditionally to a next generation, or the elite are preserved.

b. Evolutionary Strategy

Figure 12:
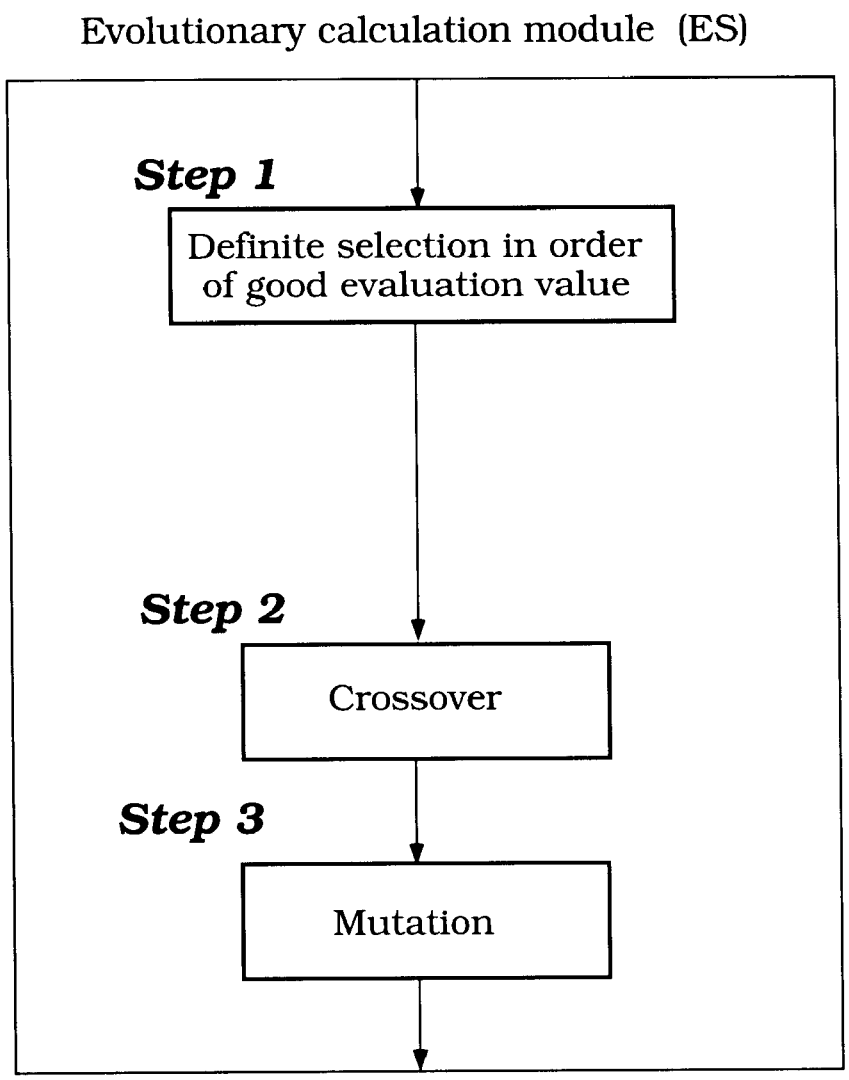
FIG. 12 is a flowchart illustrating an evolutionary calculation module that employs an evolutionary strategy as an evolutionary calculation method.

FIG. 12 is a flowchart illustrating an evolutionary calculation module that uses a evolutionary strategy as an evolutionary calculation method. After completing evaluation of all the individuals of the first generation, the module produce individual groups for a next generation when desired characteristics are not obtained.

With regard to selecting (step 1), since selection methods are different depending on the kinds of evolutionary strategy, typical two kinds of method are explained here. In the case of an evolutionary strategy called $(\mu, \lambda)$-ES, out of $\lambda$ child individuals produced by $\mu$ parent individuals, the $\lambda$ individuals are definitely selected in the order of good adaptability. In the case of an evolutionary strategy called $(\mu+\lambda)$-ES, out of individual groups in a combination of $\mu$ parent individuals and $\lambda$ child individuals, the $\mu$ individuals are definitely selected in the order of good adaptability.

There are other methods described below. When using these methods, selection suitable to each of the methods should be made.

(1, 1)-ES: Random walk (RW)

(1+1)-ES: Hill climbing $(1, \lambda)$-ES, $(1+\lambda)$-ES: Adjacent search method $(\mu+1)$-ES: Consecutive generation multi-point search method With regard to crossing over (step 2), there is used a normal distribution crossing over. However, parent values may be inherited for every parameter, and child values may be middle points, interior division points, or exterior division points.

With regard to mutating (step 3), perturbation following a normal distribution for each parameter is added. A dispersion of the normal distribution can be adjusted for each parameter, and interrelationship among parameters can be established.

The evolutionary strategy (ES) explained above has the advantage that since each parameter is used as a real value, no transformation from an expression type such as a hereditary algorithm to a gene type is necessary. Using a cross-over method which uses continuity of real numbers such as a normal distribution cross-over can reflect stronger parent characters toward child characters than when binary codes or gray codes, used frequently in a hereditary algorithm, are crossed over at one point or multiple points.

c. Evolutionary Programming (EP)

Figure 13:
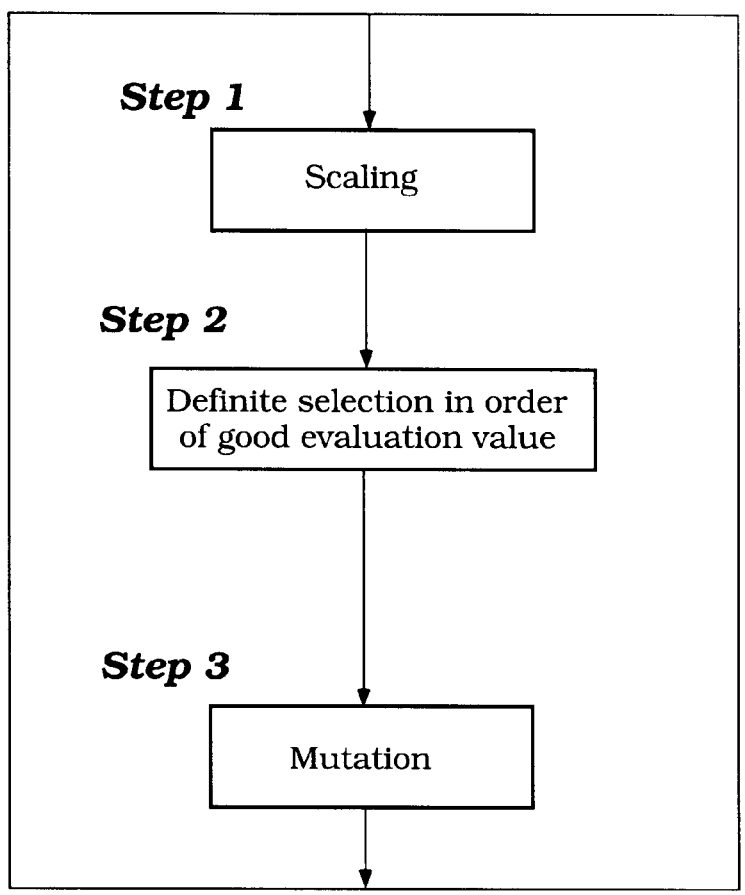
FIG. 13 is a flowchart illustrating an evolutionary calculation module that employs an evolutionary programming as an evolutionary calculation method.

FIG. 13 is a flowchart of an evolutionary calculation module that uses an evolutionary programming as an evolutionary calculation method.

With respect to scaling (step 1), in the case where the number of individuals is $\mu$, independently and randomly selected q individuals are compared with $2\mu$ individuals, the sum of the individuals which have received perturbation and the individuals which have not. The surpassing number is defined as adaptability of the individuality.

With respect to selecting (step 2), $\mu$ individuals are selected in the order good adaptability out of individuality groups generated. The selection is definite, but since scaling is probabilistic, the selection is substantially probabilistic.

The evolutionary programming (EP) explained above has the advantage that since each parameter is used as a real number, no transformation from an expression type such as a hereditary algorithm to a gene type is necessary. Since no crossing over is used, there is no limitation in the expression type. The hereditary algorithm does not have to make parameters string-shape as evolutionary strategy, and wood structure suffices.

The embodiment above explains as an optimization method an evolutionary calculation method. The optimization method in the optimal process device is not limited to this; instead different methods can be used.

1. Adjacent Search Method

As one example of adjacent search methods, a method due to a combination of simulated annealing and TABU search, which is applied to an optimal process device in FIG. 2, will be explained.

Figure 14:
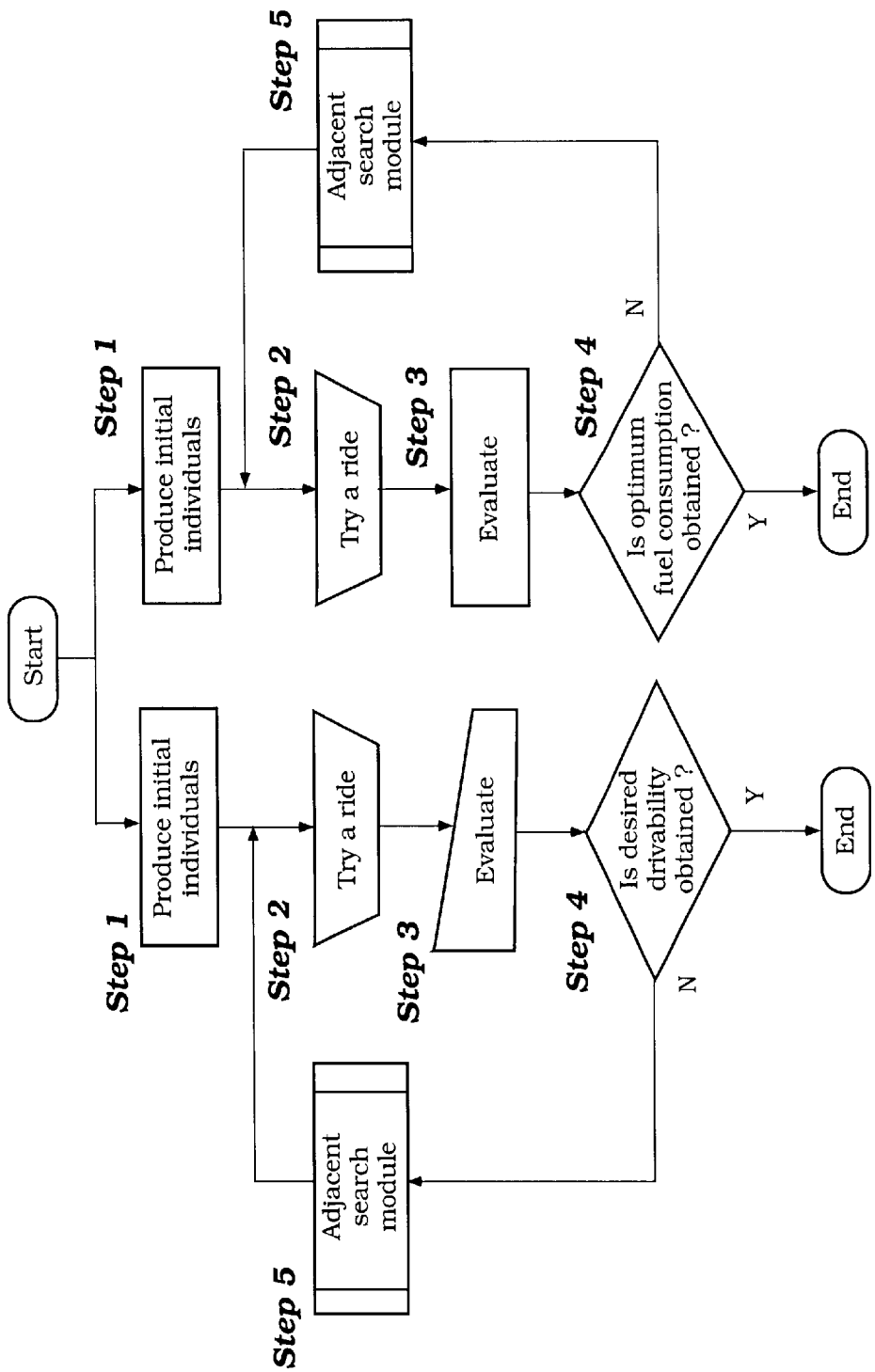
FIG. 14 is a flowchart illustrating an adjacent search method due to a combination of simulated annealing and TABU search.

FIG. 14 is a flowchart illustrating control that employs an adjacent search method in a combination of SA and TABU. Initially, a initial parameter group is generated within a predetermined range (step 1). Using the initial parameter group, a trial ride (or fuel consumption calculation) is made (step 2), and an evaluation value as the result is input (or calculated) (step 3). It is determined whether desired drivability and acceleration are obtained (step 4); if they are not, an adjacent search module begins (step 5).

Figure 15:
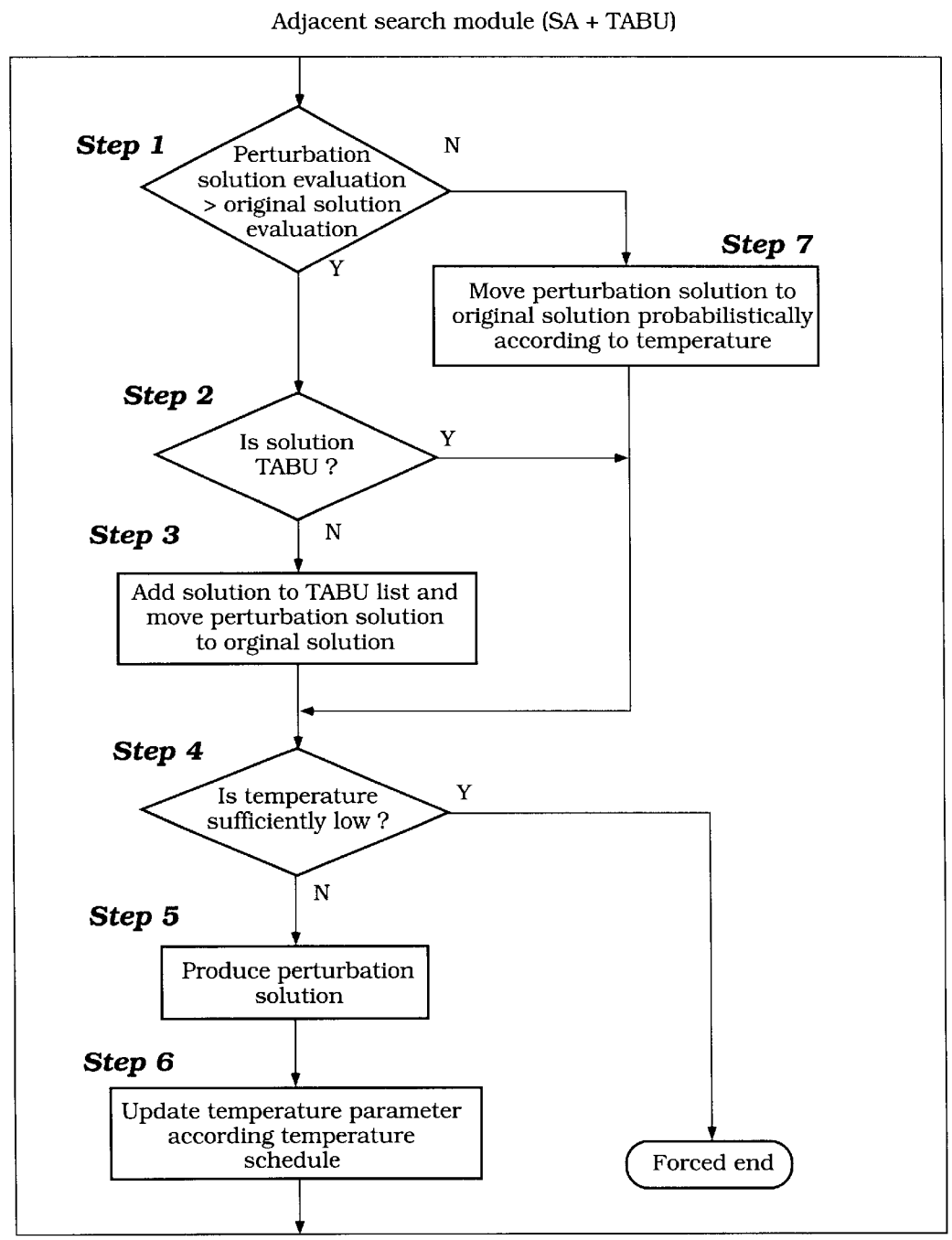
FIG. 15 is a flowchart illustrating process of an adjacent search module.

FIG. 15 is a flowchart illustrating process of an adjacent search module. Firstly, it is determined whether an evaluation of an perturbation solution is higher than that of an original solution (step 1). If it is, it is determined whether the solution belongs to a forbidden region (TABU) (step 2). If it does not, the perturbation solution is added to a TABU list and moved to the original solution (step 3). Right after the initiation of the optimal process, since there is no original solution and the TABU list is empty, solutions for the initial parameter group are set as original solutions, which are added to the TABU list (step 3). Then it is judged whether temperature is sufficiently low (step 4).

In the simulated annealing, a temperature schedule is designed beforehand so that when temperature is high, state transition occurs with a high probability, but when low, it does not easily. According to the temperature schedule, a search is conducted. Normally, the temperature schedule is designed so that an initial search area is large and a last search area is small—at a initial state temperature is high, and at a last state temperature gets lower gradually. Therefore, since temperature is high right after beginning the optimal process, forced ending is not made and a perturbation solution is produces (step 5). According to the temperature schedule, temperature parameters are updated (step 6).

The perturbation solution is produced by independently adding to each constituent of the present parameter group the perturbation following a normal distribution $N(0, \sigma^2)$ with an average 0 and a dispersion $\sigma^2$. $\sigma$ is constant, but it varies depending on search situations or can be set freely by a user according to situations.

When the perturbation solution is produced, using it the processes in FIG. 14, i.e., a trial ride (or fuel consumption calculation) (step 2) and an evaluation (step 3) are executed. If the perturbation solution does not yield the desired drivability and optimal fuel consumption, an adjacent search module begins once again (step 5).

In the adjacent search module, it is determined whether an evaluation of the perturbation solution is higher than that of the original solution (step 1). If it is, it is determined whether the perturbation solution is the TABU (step 2). If it is not, it is added to the TABU list and set to the original solution (step 4). It is judged whether temperature is sufficiently low (step 4). If it is, forced end is established; if it is not, a new perturbation solution is yielded.

In the judgement of step 1, if an evaluation of the perturbation solution is lower than that of the original solution, the perturbation solution is set probabilistically to the original solution according to the temperature. That is, the higher the temperature, the larger the search. Accordingly the search is also moved to the perturbation solution side whose evaluation is lower than the original solution. When the temperature gets lower at a last stage, the search does not move to the perturbation solution side whose evaluation is lower than the original solution since it is small.

The above mentioned process is repeated, until the desired drivability and acceleration or the optimal fuel consumption is obtained or the temperature gets sufficiently lower and the forced ending is made, which allows the optimal parameter values conducting a large search to a small search.

The probability p the perturbation solution moves to the original solution is expressed as follows:

When $\Delta E < 0$, i.e., when an evaluation value of the perturbation solution is higher than that of the original solution:

$$p=1 \text{ (i.e. 100\%)}$$

where $\Delta E$ is $E(x)-E(x')$, $E(x)$ is an evaluation value of the original solution, and $E(x')$ is an evaluation value of the perturbation solution.

When $\Delta E \geq 0$:

$$p=\exp(-\Delta E/\tau)$$

where $\tau$ is a temperature parameter.

Designating initial parameter $\tau_0$, $\tau$ is updated using the following temperature schedule:

$$\tau=\alpha \times \tau_0$$

where $0<\alpha<1$, and $\alpha$ is constant.

Initial temperature parameter $\tau_0$ is set based on time for which a user wants to optimizes and number of evaluation. When the user wants to evaluate as much as he does, random walk where $\tau$ is limitless should be used. In this way, when $\tau$ is set to be limitless, moving probability p is always 100% even if E takes any value, which allows a search not restricted to a small solution.

When the simulated annealing is applied to the interactive optimization, the present evaluation of parameter groups is compared with the previous evaluation of parameter groups and the result is input as relative evaluation value $\Delta E$. Based on this, the movement of the perturbation solution is determined.

In the above embodiment, the method in a combination of simulated annealing and TABU search is explained as an adjacent search method. It is natural that simulated annealing or TABU search can be used independently.

2. Reinforced Learning

Figure 16:
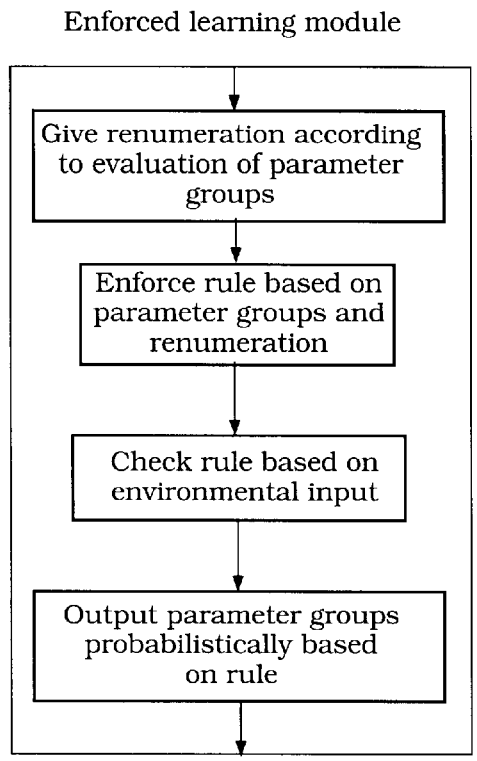
FIG. 16 is a flowchart illustrating process of a enforced learning module.

FIG. 16 is a flowchart illustrating the process of an enforced learning module. In the figure, an example using reinforced learning as optimum process is shown. The reinforced learning module is replaced by the evolutionary calculation module or the adjacent search module in FIG. 9 or 14, respectively.

The method first selects feasible rules toward inputs from an environment. Next, the rules to be carried out are determined probabilistically (differs depending on types of forced learning) and parameter groups are output based on the rules. Remuneration is given based on the result when the parameter groups are operated, and the rules should be enforced. When this is applied to interactive optimization, evaluation by the user is given as remuneration.

The reinforced learning has two types: experience reinforcement and environment identification. Since the former respects remuneration, suitable rules have higher probability to be used. Since the latter put respect on environment identification to obtain optimum policy (function that gives rules to be carried out to inputs), the rules not to be used have higher probability to be used.

3. Learning Algorithm Plus Evolutionary Calculation (or Adjacent Search Method)

Figure 17:
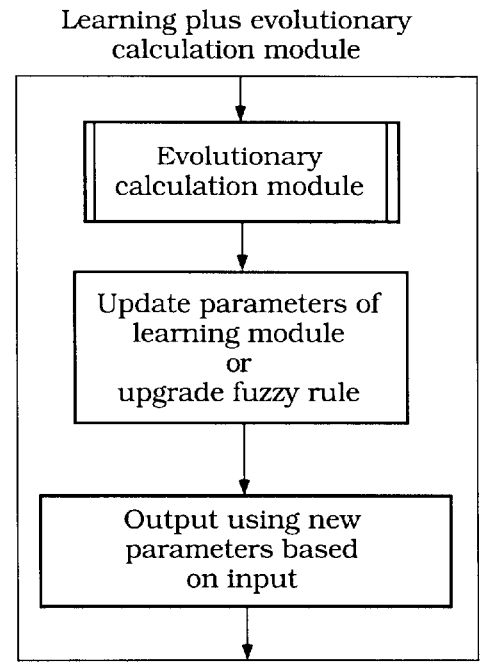
FIG. 17 is a flowchart illustrating process of a learning plus an evolutionary calculation module.

FIG. 17 is a flowchart illustrating the process of an learning plus an evolutionary calculation module. In the figure, a combination of a learning algorithm and an evolutionary calculation is used as optimum process. The learning plus the evolutionary calculation module is replaced by the evolutionary calculation module or the adjacent search module in FIG. 9 or 14, respectively.

The method, using the evolutionary calculation or the adjacent search method, optimizes input-output relationship, with coupling coefficients of a neural network, which constitutes a control module inputting a throttle opening and outputting a throttle characteristic, and fuzzy rules of a fuzzy system as a parameter group.

4. Evolutionary Calculation Plus Adjacent Search Method (Switching Type)

Figure 18:
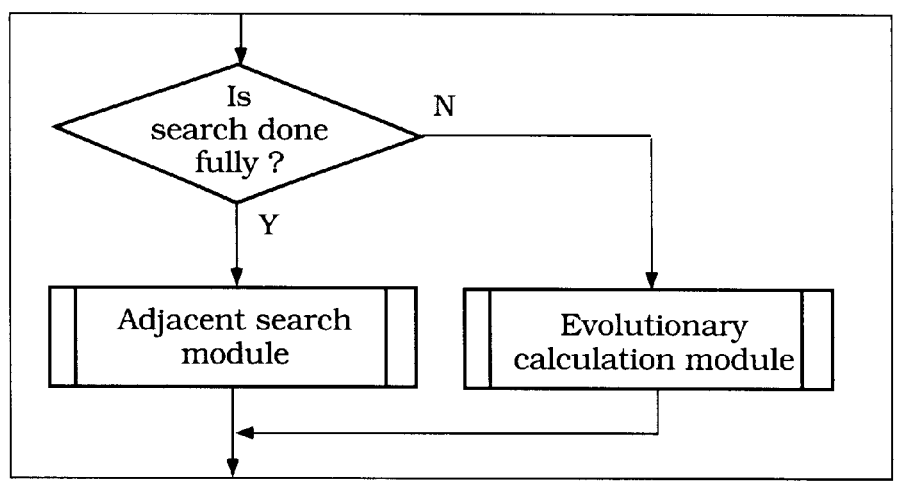
FIG. 18 is a flowchart illustrating process of an evolutionary calculation plus an adjacent search switching module.

FIG. 18 is a flowchart illustrating the process of an evolutionary calculation plus an adjacent search switching module. In the figure, the method in a combination of the evolutionary calculation and the adjacent search method is shown as optimal process. The evolutionary calculation plus the adjacent search switching module is replaced by the evolutionary calculation module or the adjacent search switching module in FIG. 9 or 14, respectively. According to the method, a large-area search is conducted by the evolutionary calculation, and at the stage where the search is successful, the search is switched to an adjacent search method to conduct a small-area search, which yields an efficient optimization.

5. Evolutionary Calculation Plus Adjacent Search Method (Composite Type)

Figure 19:
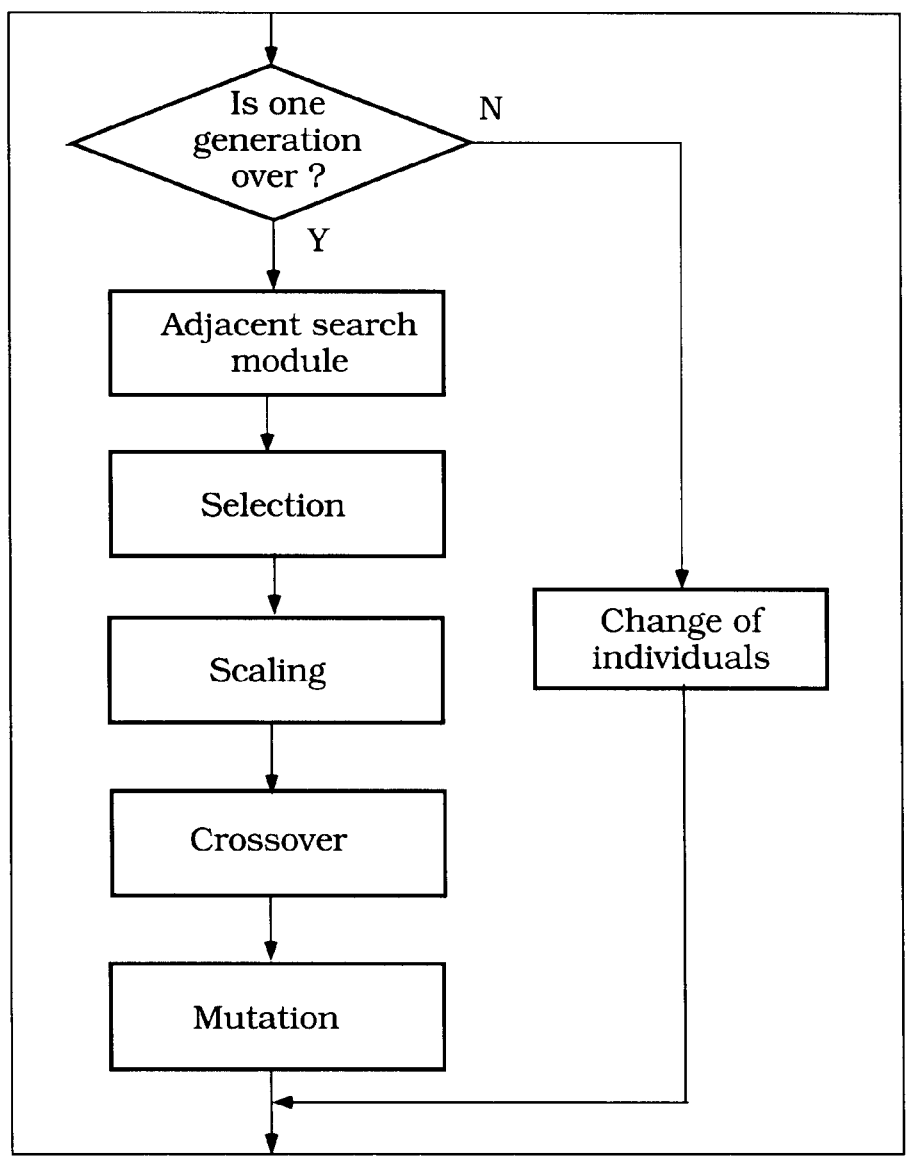
FIG. 19 is a flowchart illustrating process of a learning plus an evolutionary calculation composite module.

FIG. 19 is a flowchart illustrating the process of an learning plus an evolutionary calculation composite module. In the figure, the method in a combination of the evolutionary calculation and the adjacent search method is shown as optimal process. The learning plus the evolutionary calculation composite module is replaced by the evolutionary calculation module or the adjacent search switching module in FIG. 9 or 14, respectively.

According to the method, a small-area search by the adjacent search method is conducted for evolutionary calculation type of individuals, and since evolution using a hereditary algorithm is made regarding the small-area solution obtained as an individual an efficient optimization is possible.

6. Evolutionary Calculation Plus TABU Search

Lastly, the method in a combination of the evolutionary calculation and the TABU search will be explained using an example. Combining the evolutionary calculation with the TABU search records on a tab list the individuals the evolutionary calculation has produced and selected. Prohibition of the appearance of the recorded individuals prevents repeated evaluation of the same individual, which reduces the user' burden.

As explained above, in the case where there are a plurality of controlled systems and optimization is made on each control module, an optimal process device is provided for each on each control module to be evolved. The evaluation method of each optimal process device is not limited to a combination of the embodiments shown above; it may be either a interactive type or an automatic type, or a combination of both.

When there are a plurality of control modules and an optimal module is provided for each of the modules, some of their characteristics, which depends on the relationship of the controlled system, may be affected mutually, which trades off optimization of the characteristics. To be specific, an engine and a crane in a crane truck do not basically interact their dynamic characteristics. Therefore, even if a control module whose controlled system is an engine fuel injector and another control module whose controlled system is a crane are provided in the same controller, each control module can be optimized independently without interaction.

However, when setting a fuel injector and an electronic throttle device in the same engine as a controlled system, and optimizing the former control module so that fuel consumption may be improved and the latter control module so that response may be improved, there is a possibility that response becomes worse when fuel consumption gets better, and vice versa. In this situation, optimal process among a plurality of control modules should be cooperated. To be specific, when using either an automatic optimization method or an interactive optimization method in the optimization module of all the control modules, after optimizing one control module, by optimizing other control modules so that the characteristic obtained may be improved or maintained, characteristics of other controlled systems are optimized within a range of the optimal characteristic of one controlled system;

by optimizing a plurality of control modules at a interval so that the characteristic obtained may be improved or maintained, optimal orientation of each control module is limited and the characteristics of a plurality of controlled systems are improved for a short period of time;

during optimizing one control module, by optimizing other control modules in parallel so that the characteristic the control module obtained may be improved or maintained, suitable characteristics of other controlled systems are obtained improving the characteristic of one controlled system; or by optimizing a plurality of control modules in parallel so that the characteristic obtained may be improved or maintained, optimal orientation of each control module is limited and the characteristics of a plurality of controlled systems are improved for a short period of time.

When using a combination of an automatic optimization method and an interactive optimization method in the optimization module of a plurality of control modules, after optimizing a certain control module in the optimal control module using an interactive optimization method so that the characteristic obtained may be improved or maintained, by optimizing other control modules in the optimal control module using an automatic optimization method, the characteristics of other controlled systems are optimized within a range of the optimal characteristic of the controlled system obtained in the interactive optimization method;

after optimizing a certain control module in the optimal control module using an automatic optimization method so that the characteristic obtained may be improved or maintained, by optimizing other control modules in the optimal control module using an interactive optimization method, the characteristics of other controlled systems are optimized within a range of the optimal characteristic of the controlled system obtained in the automatic optimization method;

by repeating at a interval the optimal control module using an interactive optimization method and the optimal control module using an automatic optimization method so that the characteristic obtained may be improved or maintained, optimal orientation of each control module is limited and the characteristics of a plurality of controlled systems are improved for a short period of time;

during the optimal process in the optimal control module using an interactive optimization method so that the characteristic obtained may be improved or maintained, by doing in parallel the optimal process in the optimal control module using an automatic optimization method, suitable characteristics of other controlled systems in the automatic optimization method are obtained improving the characteristic of one controlled system in the interactive optimization method;

during the optimal process in the optimal control module using an automatic optimization method so that the characteristic obtained may be improved or maintained, by doing in parallel the optimal process in the optimal control module using an interactive optimization method, suitable characteristics of other controlled systems in the interactive optimization method are obtained improving the characteristic of one controlled system in the automatic optimization method; or by optimizing a plurality of control modules in parallel so that the characteristic obtained may be improved or maintained, optimal orientation of each control module is limited and the characteristics of a plurality of controlled systems are improved for a short period of time.

By cooperating optimization of a plurality of control modules by the methods shown above, optimization can not be traded off among the control modules, and even if a plurality of control modules are provided, optimization can be performed for a short period of time through mutual cooperation.

When mutual cooperation cannot be expected, a plurality of control modules may be optimized independently and in parallel, which expands optimal diversity and produces original effect.

Figure 20:
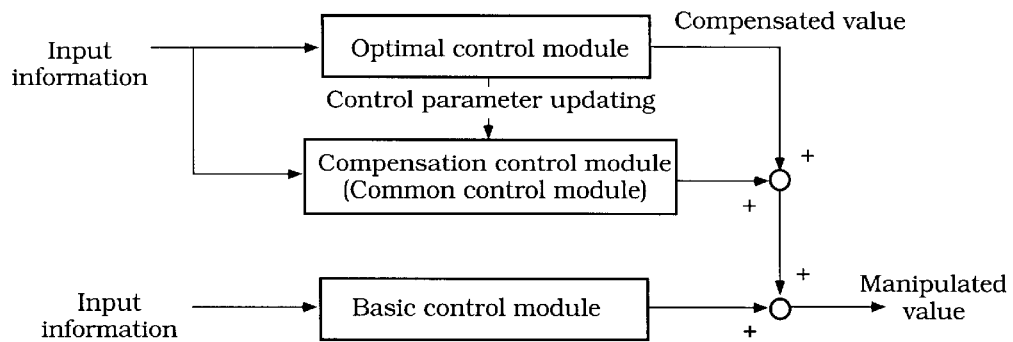
FIG. 20 is another embodiment in accordance with the invention.
Figure 21:
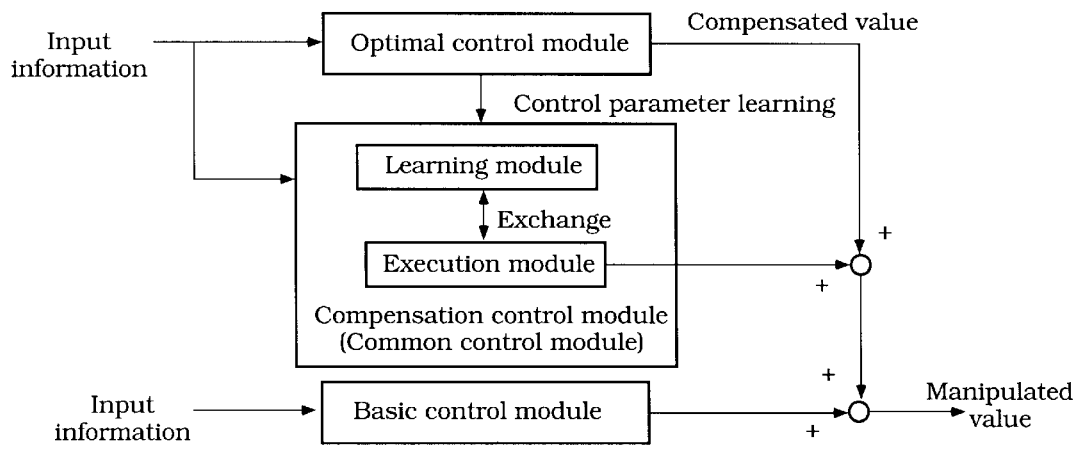
FIG. 21 is a still another embodiment in accordance with the invention.
Figure 22:
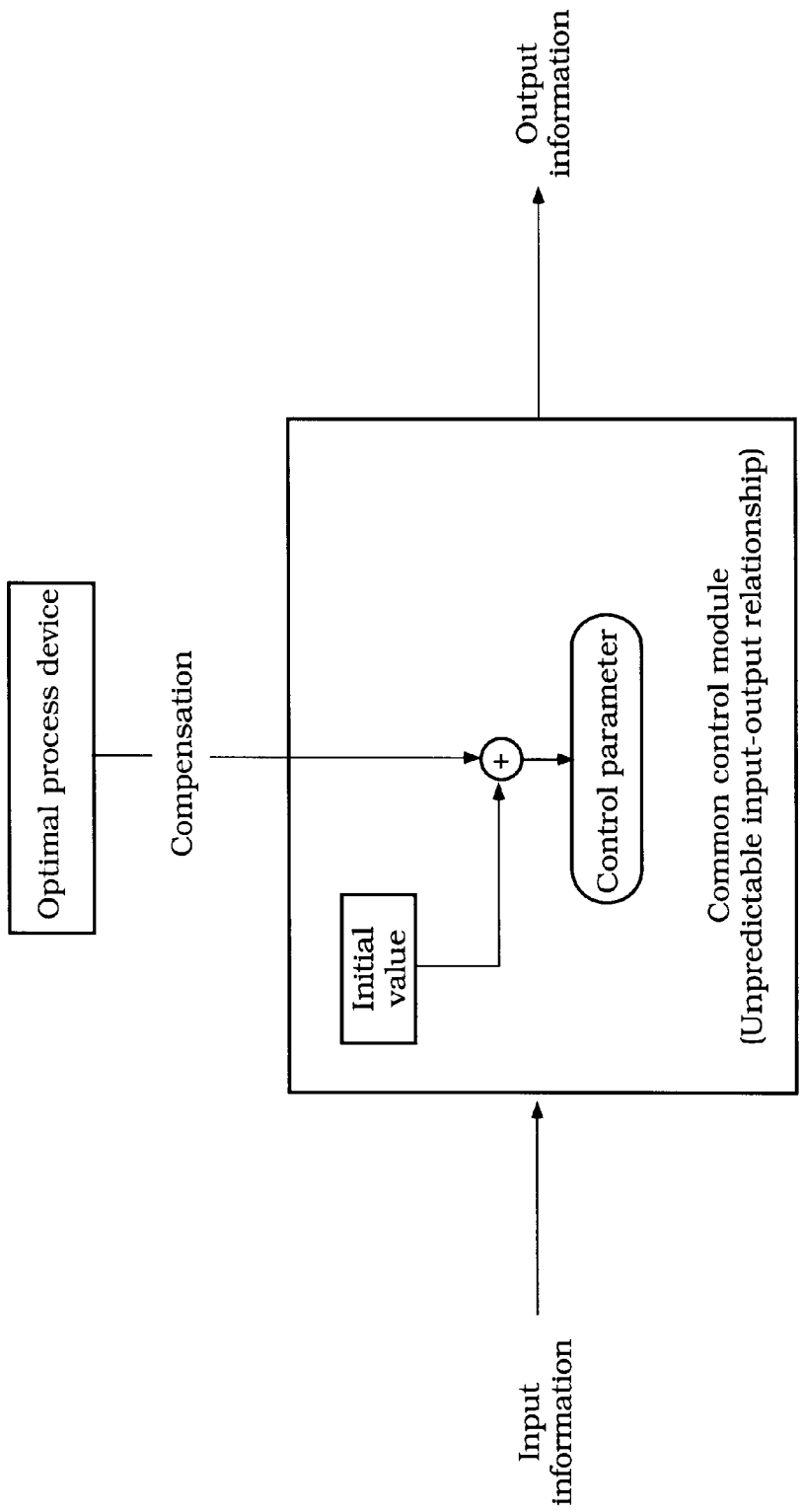
FIG. 22 is a further embodiment in accordance with the invention.
Figure 23:
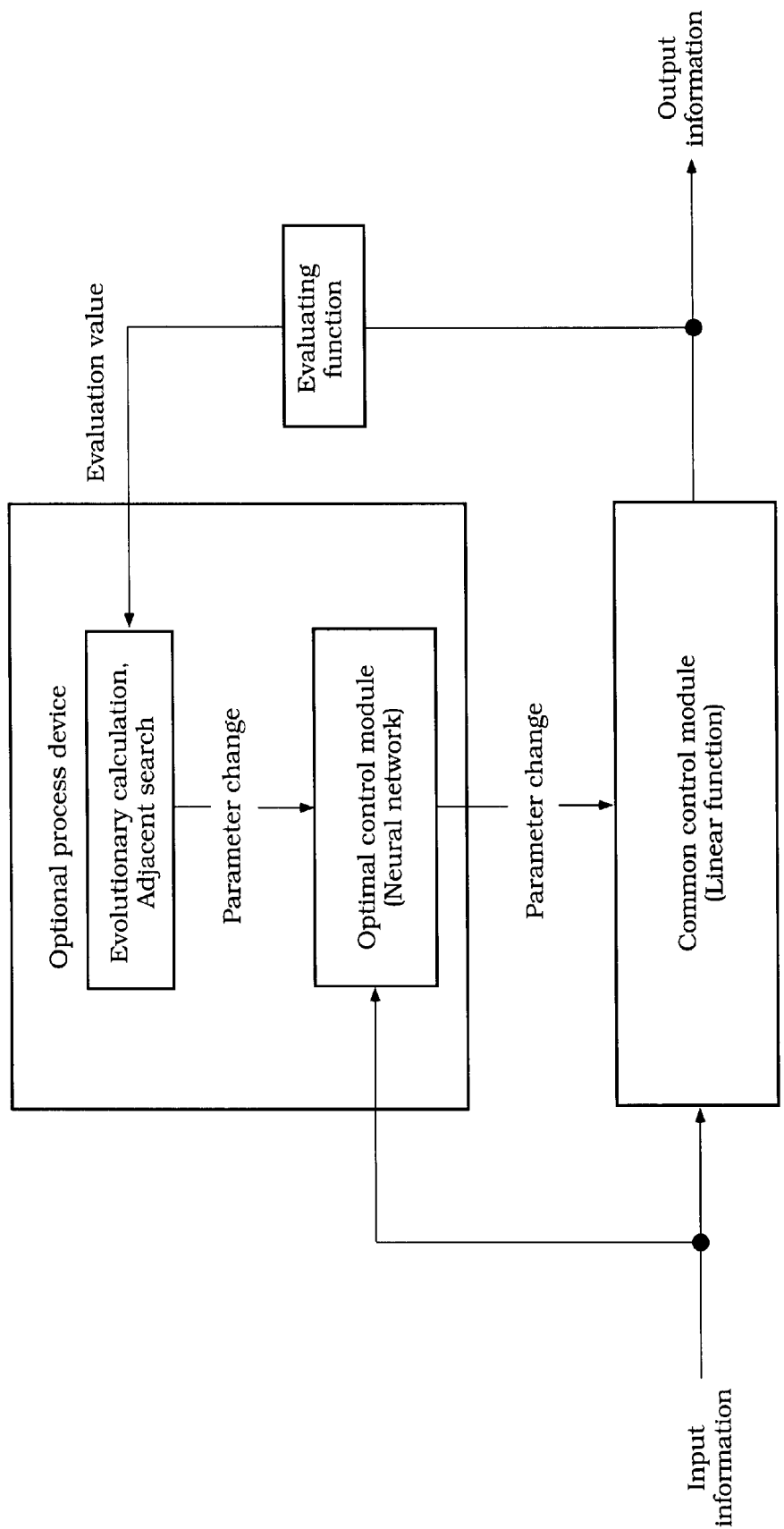
FIG. 23 is a still further embodiment in accordance with the invention.

The embodiments of the above explains a general characteristic optimization method: from the control parameters of a basic control module (to be specific, for example, the electronic throttle control module in FIG. 2) which determines a manipulated variable for a controlled variable based on a predetermined input, or a compensation control module (to be concrete, for example, the gear ratio compensation module or the fuel injection amount compensation module in FIG. 2) which determines a compensation ratio about a manipulated variable for a controlled variable based on a predetermined input, the initial parameter groups of individuals are produced directly; the control parameters are optimized by a optimization method; the control parameters of the basic control module or the compensation control module are updated to the optimized control parameters one after another. However, the invention is not limited to the above embodiments. As far as regular control modules or control parameters of the regular control modules are optimized directly, the invention can be applicable to any method. For example, the following methods can be employed:

a. In the case where a regular control module is a compensation control module that outputs a compensated value about the output of the basic control module, an optimal control module that has a control parameter equivalent to the regular control module (compensation control module) is provided. After optimizing the control parameters of the optimal control module, the control parameters of the regular control module (compensation control module) are updated to the optimized control parameters (refer to FIG. 20).

b. Where the regular control module is the compensation control module that outputs a compensated value about an output of the basic control module and a learning module and an execution module are provided, the optimal control module that has control parameters or input-output relationships equivalent to the regular control module (compensation control module) is provided. After optimizing the control parameters or input-output relationships in the optimal control module, the control parameters or input-output relationships, optimized to the learning module in the regular control module (compensation control module), are studied. After the learning module has finished its study, the learning module can be exchanged for the execution module (refer to FIG. 21).

c. The initial value for the control parameter of the regular control module is determined beforehand, and the compensation value or compensation ratio of the initial value may be optimized using the optimization method (refer to FIG. 22).

d. Where a linear function is used as a regular control module, the optimal control module is provided that outputs the control parameter of the regular control module in response to a predetermined input. The control parameter may be optimized by optimizing the optimal control module (refer to FIG. 23).

In the method d, the optimal control module can be constructed in any way. For example, when the optimal control module is constructed with a neural network that outputs the control parameter of the regular control module in response to a predetermined input, the coupling coefficient or input-output relationship may be optimized. In the case where the optimal control module is constructed with fuzzy theory, the rules will apply.

The regular control module in the methods c and d may be the basic control module or compensation control module.

In connection with the embodiments in accordance with the invention of a method for optimizing an overall characteristic, the following items are disclosed:

1) A method for optimizing an overall characteristic comprising the step of optimizing control parameters in a regular control module, using an optimization method directly, that determines an output associated with a manipulated variable of a controlled system based on predetermined input information.

2) The method of item 1, wherein said optimization method is the optimization method that uses heuristics.

3) The method of item 1 or 2, further comprising the steps of: providing an optimal control module for performing said optimization; and after finishing optimal process in said optimal control module, updating the control parameters of the regular control module to the optimized control parameters.

4) The method of item 1 or 2, further comprising the steps of: providing an optimal control module for performing said optimization; and after finishing optimal process in said optimal control module, learning the control parameters optimized to the regular control module.

5) The method of item 4, further comprising the steps of: providing said regular control module with a control module for executing control and a control module for learning; and after said control module for learning has learned the optimized control parameters, switching said control module for executing control for said control module for learning.

6) The method of item 1 or 2, further comprising the steps of: providing an optimal control module for outputting the control parameters of the regular control module based on predetermined input information; and optimizing the control parameters of the regular control module by optimizing said optimal control module.

7) The method of any of items 1 to 6, further comprising the step of using an algorithm, when the regular control module changes at least part of the control parameters, that can predict influence to other control parameters by the change.

8) The method of any of items 1 to 6, further comprising the step of using an algorithm, when the regular control module changes at least part of the control parameters, that can predict influence to the output of the control module by the change.

9) The method of item 7 or 8, wherein said regular control module has a linear input-output relation.

10) The method of any of items 1 to 9, wherein said optimization method is an evolutionary calculation method, an adjacent search method and/or an enforced learning method.

11) The method of any of items 1 to 9, wherein said optimization method is a combination of a learning algorithm or a fuzzy theory and an evolutionary calculation method or an adjacent search method.

12) The method of any of items 1 to 9, wherein said optimization method is a combination of an evolutionary calculation method and an adjacent search method.

13) The method of any of items 1 to 12, wherein said regular control module is the control module which outputs the manipulated variable of the controlled system based on predetermined input information.

14) The method of item 13, wherein said regular control module inputs a manipulated variable for a user and outputs a manipulated variable for the controlled system.

15) The method of item 12 or 13, wherein said controlled system is a means for controlling performance of a final controlled system.

16) The method of item 15, wherein said final controlled system is a motor, a prime mover, or a combination of a motor and a prime mover.

17) The method of item 16, wherein said motor, said prime mover, or said combination of a motor and a prime mover are loaded on a vehicle.

18) The method of any of items 15 to 17, wherein said means for controlling performance of a final controlled system is a electronic throttle, and said regular control module inputs a manipulated variable of a throttle lever and outputs a manipulated variable of an intake air amount changing means.

19) The method of item 18, wherein said regular control module has control parameters regarding a static characteristic of the manipulated variable of an intake air amount changing means about the manipulated variable of a throttle lever, and said control parameters regarding a static characteristic are optimized by said optimization method.

20) The method of item 19, wherein said regular control module has control parameters regarding a dynamic characteristic of the manipulated variable of an intake air amount changing means about the manipulated variable of a throttle lever, as a first-order lag time constant and/or an acceleration compensation coefficient that are/is added to the throttle input, and said control parameters regarding a dynamic characteristic are optimized by said optimization method.

21) The method of any of items 1–12, wherein said regular control module is that control module which outputs a compensated value regarding the manipulated variable of a controlled system based on predetermined input information.

22) The method of any of items 1–12, wherein said regular control module is that control module which outputs a compensation ratio regarding the manipulated variable of a controlled system based on predetermined input information.

23) The method of item 21 or 22, wherein said controlled system is a means for controlling performance of a final controlled system.

24) The method of item 23, wherein said final controlled system is a motor, a prime mover, or a combination of a motor and a prime mover.

25) The method of item 24, wherein said motor, said prime mover, or said combination of a motor and a prime mover are loaded on a vehicle.

26) The method of any of items 23–25, wherein said means for controlling performance of a final controlled system is an electronic control fuel injector, and said regular control module outputs a compensation value or compensation ratio about a basic fuel injection amount to the injector based on input information.

27) The method of any of items 23–25, wherein said means for controlling performance of a final controlled system is a non-stage transmission, and said regular control module outputs a compensation value or compensation ratio about a gear ratio of the non-stage transmission based on input information.

28) The method of any of items 23–25, wherein said means for controlling performance of a final controlled system is a non-stage transmission, and said regular control module outputs a compensation value or compensation ratio about a gear speed of the non-stage transmission based on input information.

29) The method of any of items 1–28, wherein said optimization is made based on evaluation under user's intention.

30) The method of any of items 1–29, wherein said optimization is made based on predetermined evaluation reference.

31) The method of item 30, wherein said evaluation reference is set based on a basic characteristic of a controlled system with aging deterioration.

32) The method of item 30, wherein said evaluation reference is set based on regulation about a controlled system.

The invention of a method for optimizing an overall characteristic produces the following advantages:

Since a method for optimizing an overall characteristic of the invention optimizes the control parameter of the regular control module using a direct optimizing method, the optimized characteristic can be reflected to the controlled system in a short period of time.

In the optimization method that optimizes the input-output relationship in the conventional regular control module, learning in the regular control module is essential to reflect an optimized input-output relationship to the regular control module. However, since a method for optimizing an overall characteristic of the invention directly optimizes the control parameter of the regular control module, learning is not essential. When learning is not conducted, operation will be simpler and capacity of memories will also be smaller.

According to item 18, when the electronic throttle is a controlled system, the manipulated value and input information of the control module are manipulated variables for the throttle lever and the intake atmosphere amount changing means, and the control module is optimized, which reduces spikes and improves fuel consumption and gas exhaustion performance. In addition, driving characteristic of vehicles can be changed according to the user's preference.

According to item 19, the control module has information on a static characteristic of the manipulated variable of the intake atmosphere amount changing means about the manipulated variable for the throttle lever, and the optimization method optimizes information on the static characteristic, which can optimize a driving characteristic at stationary running.

According to item 20, the control module has information on a dynamic characteristic of the manipulated variable of the intake atmosphere amount changing means about the manipulated variable for the throttle lever, as an algorithm which adds a first-order lag time constant and/or an acceleration compensation constant to a throttle input. The optimization method varies the first-order lag time constant and/or the acceleration compensation constant to optimize information as to the dynamic characteristic, which can optimize a transient movement characteristic.

According to item 26, when the electronic control fuel injector is a controlled system, the control module is constructed so that fuel injection amount in the fuel injector is output in response to predetermined input information and the control module is optimized, which enables optimization of engine performance, fuel consumption performance and gas exhaustion performance.

According to item 27, when a non-stage transmission is a controlled system, input-output information of the control module is provided as a manipulated amount of the throttle lever and a gear ratio in the non-stage transmission and the control module is optimized, which enables optimization of torque output and fuel consumption performance.

According to item 28, when a non-stage transmission is a controlled system, input-output information of the control module is provided as a manipulated amount of the throttle lever and a speed in the non-stage transmission and the control module is optimized, which enables optimization of acceleration feeling of a vehicle.

In connection with the embodiments in accordance with the invention of an apparatus for optimizing an overall characteristic, the following items are disclosed:

1) An apparatus for optimizing an overall characteristic comprising: a regular control unit including a regular control module which determines an output associated with a manipulated variable of a controlled system based on predetermined input information; and an optimal process unit for directly optimizing control parameters of said regular control module using an optimization method having heuristics.

2) The apparatus of item 1, wherein said optimal process unit includes: an optimal operation device which performs operation on a optimization method; and an automatic evaluation device which conducts evaluation on optimal process based on evaluation reference set beforehand, whereby said optimal process controls control parameters obtained from the optimal operation by using the regular control module and optimization is proceeded with the result evaluated by the automatic evaluation device.

3) The apparatus of item 1, wherein said optimal process unit includes: an optimal operation device which performs operation on a optimization method; and means for inputting evaluation based on user's intention on optimal process, whereby said optimal process controls control parameters obtained from the optimal operation by using the regular control module, and optimization is proceeded with the result evaluated by the automatic evaluation device.

4) The apparatus of item 1, wherein said optimal process unit includes: an optimal operation device which performs operation on a optimization method; an optimal module for outputting values of the control parameters of the regular control module based on predetermined input information; and an automatic evaluation device which conducts evaluation on optimal process based on evaluation reference set beforehand, whereby said optimal process controls control parameters obtained from the optimal module by using the regular control module, and optimization of the optimal module is proceeded, with the result evaluated by the automatic evaluation device, so that optimal control parameters from the optimal module can be obtained.

5) The apparatus of item 1, wherein said optimal process unit includes: an optimal operation device which performs operation on a optimization method; an optimal module for outputting values of the control parameters of the regular control module based on predetermined input information; and means for inputting evaluation based on user's intention on optimal process, whereby said optimal process controls control parameters obtained from the optimal module by using the regular control module, and optimization of the optimal module is proceeded, with the result evaluated by the automatic evaluation device, so that optimal control parameters from the optimal module can be obtained.

6) The apparatus of any of items 1–5, wherein said regular control module, when at least part of the control parameters are changed, uses an algorithm which can predict influence the change will give to other control parameters.

7) The apparatus of any of items 1–5, wherein said regular control module, when at least part of the control parameters are changed, uses an algorithm which can predict influence the change will give to an output of the control module.

8) The apparatus of item 5 or 6, wherein said regular control module has linear input-output relationship.

9) The apparatus of any of items 1 to 8, wherein said optimal operation device conducts operation on optimization by using an evolutionary calculation method, an adjacent search method and/or an enforced learning method.

10) The apparatus of any of items 5 to 8, wherein said optimal operation device conducts operation on optimization by using an evolutionary calculation method or an adjacent search method, and said optimal module is constructed based on a learning algorithm or a fuzzy theory.

11) The apparatus of any of items 1 to 8, wherein said optimal operation device conducts operation on optimization by using a combination of an evolutionary calculation method and an adjacent search method.

12) The apparatus of any of items 1 to 11, wherein said regular control module is the control module which outputs the manipulated variable of the controlled system based on predetermined input information.

13) The apparatus of item 12, wherein said regular control module inputs a manipulated variable for a user and outputs a manipulated variable for the controlled system.

14) The apparatus of item 11 or 12, wherein said controlled system is a means for controlling performance of a final controlled system.

15) The apparatus of item 14, wherein said final controlled system is a motor, a prime mover, or a combination of a motor and a prime mover.

16) The apparatus of item 15, wherein said motor, said prime mover, or said combination of a motor and a prime mover are loaded on a vehicle.

17) The apparatus of any of item 14 to 16, wherein said means for controlling performance of a final controlled system is a electronic throttle, and said regular control module inputs a manipulated variable of a throttle lever and outputs a manipulated variable of an intake air amount changing means.

18) The apparatus of item 17, wherein said regular control module uses control parameters regarding a static characteristic of the manipulated variable of an intake air amount changing means about the manipulated variable of a throttle lever, and said optimal process unit optimizes said control parameters regarding the static characteristic.

19) The apparatus of item 17 or 18, wherein said regular control module uses control parameters regarding a dynamic characteristic of the manipulated variable of an intake air amount changing means about the manipulated variable of a throttle lever, as a first-order lag time constant and/or an acceleration compensation coefficient that are/is added to the throttle input, and said optimal process unit optimizes said control parameters regarding the dynamic characteristic.

20) The apparatus of any of items 1–11, wherein said regular control unit includes a basic control module which outputs a basic manipulated variable of a controlled system based on predetermined input information, and a compensation control module which outputs a compensated value regarding the basic manipulated variable of the basic control module, and the compensation control module is said regular control module.

21) The apparatus of any of items 1–11, wherein said regular control unit includes a basic control module which outputs a basic manipulated variable of a controlled system based on predetermined input information, and a compensation control module which outputs a compensated ratio regarding the basic manipulated variable of the basic control module, and the compensation control module is said regular control module.

22) The apparatus of item 20 or 21, wherein said controlled system is a means for controlling performance of a final controlled system.

23) The apparatus of item 22, wherein said final controlled system is a motor, a prime mover, or a combination of a motor and a prime mover.

24) The apparatus of item 23, wherein said motor, said prime mover, or said combination of a motor and a prime mover are loaded on a vehicle.

25) The apparatus of any of items 21–24, wherein said means for controlling performance of a final controlled system is an electronic control fuel injector, said basic control module outputs a basic fuel injection amount to said injector based on input information, and said compensation control module outputs a compensation value or compensation ratio about the basic fuel injection amount to the injector based on input information.

26) The apparatus of any of items 21–24, wherein said means for controlling performance of a final controlled system is a non-stage transmission, said basic control module outputs a basic gear ratio to said non-stage transmission based on predetermined input information, and said compensation control module outputs a compensation value or compensation ratio about of the basic gear ratio based on predetermined input information.

27) The apparatus of any of items 21–24, wherein said means for controlling performance of a final controlled system is a non-stage transmission, said basic control module outputs a basic gear speed to said non-stage transmission based on predetermined input information, and said compensation control module outputs a compensation value or compensation ratio about of the basic gear speed based on predetermined input information.

The invention of an apparatus for optimizing an overall characteristic produces the following advantages:

Since an apparatus for optimizing an overall characteristic comprises a regular control unit including a regular control module which determines an output associated with a manipulated variable of a controlled system based on predetermined input information, and an optimal process unit for directly optimizing control parameters of said regular control module using an optimization method having heuristics, the optimized characteristic can be reflected to the controlled system in a short period of time.

In the optimal apparatus that optimizes the input-output relationship in the conventional regular control module, learning in the regular control module is essential to reflect an optimized input-output relationship to the regular control module. However, since an apparatus for optimizing an overall characteristic of the invention directly optimizes the control parameter of the regular control module, learning is not essential. When learning is not conducted, operation will be simpler and capacity of memories will also be smaller.

According to item 17, when the electronic throttle is a controlled system, the manipulated value and input information of the control module are manipulated variables for the throttle lever and the intake atmosphere amount changing means, and the control module is optimized, which reduces spikes and improves fuel consumption and gas exhaustion performance. In addition, driving characteristic of vehicles can be changed according to the user's preference.

According to item 18, the control module has information on a static characteristic of the manipulated variable of the intake atmosphere amount changing means about the manipulated variable for the throttle lever, and the optimization method optimizes information on the static characteristic, which can optimize a driving characteristic at stationary running.

According to item 19, the control module has information on a dynamic characteristic of the manipulated variable of the intake atmosphere amount changing means about the manipulated variable for the throttle lever, as an algorithm which adds a first-order lag time constant and/or an acceleration compensation constant to a throttle input. The optimization method varies the first-order lag time constant and/or the acceleration compensation constant to optimize information as to the dynamic characteristic, which can optimize a transient movement characteristic.

According to item 25, when the electronic control fuel injector is a controlled system, the control module is constructed so that fuel injection amount in the fuel injector is output in response to predetermined input information and the control module is optimized, which enables optimization of engine performance, fuel consumption performance and gas exhaustion performance.

According to item 26, when a non-stage transmission is a controlled system, input-output information of the control module is provided as a manipulated amount of the throttle lever and a gear ratio in the non-stage transmission and the control module is optimized, which enables optimization of torque output and fuel consumption performance.

According to item 27, when a non-stage transmission is a controlled system, input-output information of the control module is provided as a manipulated amount of the throttle lever and a speed in the non-stage transmission and the control module is optimized, which enables optimization of acceleration feeling of a vehicle.

In connection with the embodiments in accordance with the invention of a cooperative method for optimization in a method for optimizing a characteristic, the following items are disclosed:

1) A cooperative method for optimization in a method for optimizing a characteristic comprising the steps of: optimizing each characteristic of a plurality of regular control modules that determine an output associated with a manipulated variable of a controlled system based on predetermined input information; and after optimizing one regular control module, optimizing other regular control modules so that an obtained characteristic can be improved or maintained.

2) A cooperative method for optimization in a method for optimizing a characteristic comprising the steps of: optimizing each characteristic of a plurality of regular control modules that determine an output associated with a manipulated variable of a controlled system based on predetermined input information; and optimizing a plurality of regular control modules at a interval so that obtained characteristics can be improved or maintained.

3) A cooperative method for optimization in a method for optimizing a characteristic comprising the steps of: optimizing each characteristic of a plurality of regular control modules that determine an output associated with a manipulated variable of a controlled system based on :predetermined input information; and during optimizing one regular control module, optimizing other regular control modules in parallel so that obtained characteristics the regular control module obtained can be improved or maintained.

4) A cooperative method for optimization in a method for optimizing a characteristic comprising the steps of: optimizing each characteristic of a plurality of regular control modules that determine an output associated with a manipulated variable of a controlled system based on predetermined input information; and optimizing a plurality of regular control modules in parallel so that obtained characteristics can be improved or maintained.

5) The cooperative method of any of items 1 to 5 comprising the steps of: for optimizing at least one of the regular control modules, using an automatic evaluation method which evaluates during optimization based on evaluation reference set beforehand; and for optimizing other regular control modules, using an interactive evaluation method which evaluates during optimization based on evaluation under user's intention.

6) The cooperative method of item 5, wherein said evaluation reference is set based on a reference characteristic of a controlled system having aging deterioration.

7) The cooperative method of item 5, wherein said evaluation reference is set based on a regulation of a controlled system.

8) A cooperative method for optimization in a method for optimizing a characteristic comprising the steps of: optimizing each of a plurality of characteristics of regular control modules that determine an output associated with a manipulated variable of a controlled system based on predetermined input information; and after optimizing other characteristics, optimizing other regular control modules so that an obtained characteristic can be improved or maintained.

9) A cooperative method for optimization in a method for optimizing a characteristic comprising the steps of: optimizing each of a plurality characteristics of the regular control modules that determine an output associated with a manipulated variable of a controlled system based on predetermined input information; and optimizing a plurality of characteristics at a interval so that obtained characteristics can be improved or maintained.

10) A cooperative method for optimization in a method for optimizing a characteristic comprising the steps of: optimizing each of a plurality characteristics of the regular control modules that determine an output associated with a manipulated variable of a controlled system based on predetermined input information; and during optimizing one characteristic, optimizing other characteristics in parallel so that the characteristic can be improved or maintained.

11) A cooperative method for optimization in a method for optimizing a characteristic comprising the steps of: optimizing each of a plurality of characteristics of the regular control modules that determine an output associated with a manipulated variable of a controlled system based on predetermined input information; and optimizing a plurality of characteristics in parallel so that obtained characteristics can be improved or maintained.

12) The cooperative method of any of items 8 to 11 comprising the steps of: for optimizing at least one of the regular control modules, using an automatic evaluation method which evaluates during optimization based on evaluation reference set beforehand; and for optimizing other regular control modules, using an interactive evaluation method which evaluates during optimization based on evaluation under user's intention.

13) The cooperative method of item 12, wherein said evaluation reference is set based on a reference characteristic of a controlled system having aging deterioration.

14) The cooperative method of item 12, wherein said evaluation reference is set based on regulation of a controlled system.

The invention of a cooperative method for optimization in a method for optimizing a characteristic produces the following advantages:

According to item 1, since a cooperative method for optimization in a method for optimizing a characteristic comprises the steps of optimizing each characteristic of a plurality of regular control modules that determine an output associated with a manipulated variable of a controlled system based on predetermined input information, and after optimizing one regular control module, optimizing other regular control modules so that an obtained characteristic can be improved or maintained, the characteristics of the other controlled systems can be optimized within a range of an optimal characteristic of one controlled system According to item 2, since a cooperative method for optimization in a method for optimizing a characteristic comprising the steps of optimizing each characteristic of a plurality of regular control modules that determine an output associated with a manipulated variable of a controlled system based on predetermined input information, and optimizing a plurality of regular control modules at a interval so that obtained characteristics can be improved or maintained, orientation of optimization of each regular control module is restricted, which enables the characteristic of a plurality of controlled systems to be improved for a period of time.

According to item 3, since a cooperative method for optimization in a method for optimizing a characteristic comprising the steps of optimizing each characteristic of a plurality of regular control modules that determine an output associated with a manipulated variable of a controlled system based on predetermined input information, and during optimizing one regular control module, optimizing other regular control modules in parallel so that obtained characteristics the regular control module obtained can be improved or maintained, with the characteristic of one controlled variable improving, suitable characteristics of other controlled variables can be obtained.

According to item 4, since a cooperative method for optimization in a method for optimizing a characteristic comprising the steps of optimizing each characteristic of a plurality of regular control modules that determine an output associated with a manipulated variable of a controlled system based on predetermined input information, and optimizing a plurality of regular control modules in parallel so that obtained characteristics can be improved or maintained, orientation of optimization of each regular control module is restricted, which enables the characteristic of a plurality of controlled systems to be improved for a period of time.

According to item 5, in any of items 1 to 5, since the cooperative method of comprises the steps of, for optimizing at least one of the regular control modules, using an automatic evaluation method which evaluates during optimization based on evaluation reference set beforehand, and for optimizing other regular control modules, using an interactive evaluation method which evaluates during optimization based on evaluation under user's intention, when after optimizing one regular control module using an interactive optimization method, optimizing other regular control modules so that an obtained characteristic can be improved or maintained, the characteristics of other controlled systems can be optimized within a range of an optimal characteristic of the controlled system obtained by an interactive optimization method;

when after optimizing one regular control module using an automatic evaluation method, optimizing other regular control modules so that an obtained characteristic can be improved or maintained, the characteristics of other controlled systems can be optimized within a range of an optimal characteristic of the controlled system obtained by an automatic evaluation method;

when repeating at an interval the optimization of regular control modules using an interactive evaluation method and the optimization of regular control modules using an automatic optimization method so that an obtained characteristic can be improved or maintained, orientation of optimization of each regular control module is restricted, which enables the characteristic of a plurality of controlled systems to be improved for a period of time;

when, during optimizing one regular control module using an interactive evaluation method, optimizing other regular control modules in parallel using an automatic optimization method so that obtained characteristics can be improved or maintained, an automatic optimization method can obtain a suitable characteristic of other controlled systems while an interactive evaluation method improves the characteristic of one controlled system; and when, during optimizing one regular control module using an automatic evaluation method, optimizing other regular control modules in parallel using an interactive optimization method so that obtained characteristics can be improved or maintained, an interactive optimization method can obtain a suitable characteristic of other controlled systems while an automatic evaluation method improves the characteristic of one controlled system.

When setting beforehand evaluation reference based on a reference characteristic of a controlled system having aging deterioration or a regulation of a controlled system and evaluating within a range of the evaluation reference under user's intention, the characteristic can be optimized within the regulation according to the user's preference.

Additionally, in the present invention, correlations between various inputs and various outputs of the control modules can be determined using existing techniques such as neural networks, fuzzy neural networks, and genetic algorithms if the correlations are highly complex, or using existing techniques such as maps and functional equations if the correlations are rather simple. In this regard, Da Ruan (editor)"Intelligent Hybrid Systems—Fuzzy Logic, Neural Networks, and Genetic Algorithms—" Kluwer Academic Publishers (1997), J.-S. R. Jang, C.-T. Sun, E. Mizutani, "Neuro-Fuzzy and Soft Computing" Prentice Hall Upper Saddle River, N.J. 07458 (1997), C.-T. Lin and C. S. George Lee, "Neural Fuzzy Systems" Prentice Hall Upper Saddle River, N.J. 07458 (1998), and N. K. Kasabov, "Foundations of Neural Networks, Fuzzy Systems, and Knowledge Engineering" the MIT Press (1996) are hereby incorporated by reference. The above techniques can be combined, and learning control can be adapted for any techniques.

Further, in addition to genetic algorithms (GA), genetic programming (GP) or other evolutionary computing techniques can be adapted to the present invention (Wolfgang Banzhaf, et al. (editor), "Genetic Programming, An Introduction", pp. 363–377, 1999, Morgan Kaufmann Publishers, Inc., for example). These techniques are sometimes categorized as "heuristic control" which includes evolution, simulated annealing, and reinforcement learning method (S. Suzuki, et al., "Vision-Based Learning for Real Robot: Towards RoboCup", RoboCup—97 Workshop, 23, 24, and 29 August, 1997 Nagoya Congress Center, pp. 107–110; K. and Nurmela, et al., "Constructing Covering Designs By Simulated Annealing", pp. 4–7, Helsinki University of Technology, Digital Systems Laboratory, Technical Reports No. 10, January 1993, for example). These techniques can be adapted to the present invention without complication, based on the principle described earlier; that is, in the present invention, "evolutionary computing" includes the above various techniques.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A method for controlling performance of a device operated by a user, which performance is controlled essentially by at least two control modules each having an input-output relationship regulated by control parameters, optimization of one module affecting optimization of the other, said method comprising the steps of:
   (a) preselecting values of the control parameters for each module and activating the device;
   (b) on-line changing values of the control parameters within predetermined ranges under predetermined coding rules;
   (c) on-line evaluating the performance of the device based on signals indicative of the performance with respect to one module and by the user with respect to the other;
   (d) on-line selecting values of the control parameters based on the evaluation outcome; and
   (e) repeating steps (b) through (d) while operating the device until desired performance of the device is demonstrated, wherein the at least two control modules are optimized.

2. The method according to claim 1, wherein optimization by steps (a) through (d) is conducted on each control module in repetitive sequence.

3. The method according to claim 1, wherein the device is a control module for controlling another device.

4. An apparatus for optimizing an overall characteristic comprising:
   a regular control unit including at least two regular control modules which determine an output associated with a manipulated variable of a controlled system based on predetermined input information; and
   an optimal process unit for directly optimizing control parameters of said regular control modules configured to perform the optimization method of claim 1.

5. The method according to claim 1, wherein after optimizing one control module, the other control module is optimized so that an obtained characteristic can be improved or maintained.

6. The method according to claim 1, wherein the control modules are optimized at a interval so that obtained characteristics can be improved or maintained.

7. The method according to claim 1, wherein during optimizing one control module, the other control module is optimized in parallel so that obtained characteristics can be improved or maintained.

8. The method according to claim 1 wherein the control modules are optimized in parallel so that obtained characteristics can be improved or maintained.

9. A method for controlling performance of a device, which performance is controlled essentially by at least two control modules each having an input-output relationship regulated by control parameters, optimization of one module affecting optimization of the other, said method comprising the steps of:
   (a) preselecting multiple candidates of values of the control parameters for each module;
   (b) activating the device using each candidate in sequence, wherein all of the candidates are used in one cycle;
   (c) on-line repeating the cycle multiple times;
   (d) on-line evaluating the performance of the device based on signals indicative of the performance;
   (e) on-line selecting desirable candidates of the control parameters based on the evaluation outcome;
   (f) on-line formulating new candidates from the selected candidates;
   (g) repeating steps (b) through (f) while operating the device until desired performance of the device is demonstrated, wherein the at least two control modules are optimized.

10. The method according to claim 9, wherein the device is an engine for a vehicle.

11. The method according to claim 10, wherein the module which is subjected to the method controls a fuel efficiency, and the other module controls acceleration characteristics.

* * * * *